(12) United States Patent
Mohan et al.

(10) Patent No.: US 10,894,548 B2
(45) Date of Patent: Jan. 19, 2021

(54) METHOD AND SYSTEM FOR OPTIMIZATION OF MILEAGE AND SPEED WITH RESPECT TO FUEL IN VEHICLE

(71) Applicant: SAINT SITA RAM INNOVATION LAB PRIVATE LIMITED, Punjab (IN)

(72) Inventors: Lalit Mohan, Punjab (IN); Rahul Jindal, Punjab (IN)

(73) Assignee: SAINT SITA RAM INNOVATION LAB PRIVATE LIMITED, Punjab (IN)

( * ) Notice: Subject to any disclaimer, the term of this patent is extended or adjusted under 35 U.S.C. 154(b) by 166 days.

(21) Appl. No.: 16/171,330

(22) Filed: Oct. 25, 2018

(65) Prior Publication Data
US 2019/0061779 A1 Feb. 28, 2019

Related U.S. Application Data

(63) Continuation of application No. PCT/IB2017/053484, filed on Jun. 13, 2017.

(30) Foreign Application Priority Data

Sep. 15, 2016 (IN) .............................. 201611031492

(51) Int. Cl.
| | |
|---|---|
| *B60W 50/08* | (2020.01) |
| *G01C 21/36* | (2006.01) |
| *G01C 21/26* | (2006.01) |
| *B60K 35/00* | (2006.01) |
| *B60Q 11/00* | (2006.01) |

(Continued)

(52) U.S. Cl.
CPC .......... *B60W 50/082* (2013.01); *B60K 35/00* (2013.01); *B60Q 11/00* (2013.01); *B60W 30/143* (2013.01); *B60W 40/105* (2013.01); *B60W 50/0225* (2013.01); *G01C 21/26* (2013.01); *G01C 21/3697* (2013.01); *B60K 2370/167* (2019.05); *B60K 2370/174* (2019.05); *B60W 50/0098* (2013.01)

(58) Field of Classification Search
CPC .... G01C 21/26; G01C 21/3697; B60K 35/00; B60K 2370/174; B60K 2370/167; B60W 50/082; B60W 50/0098; B60W 30/143; B60W 40/105; B60W 50/0225; B60Q 11/00
See application file for complete search history.

(56) References Cited

U.S. PATENT DOCUMENTS

| | | | | |
|---|---|---|---|---|
| 9,638,542 | B2 * | 5/2017 | Son | G01C 21/3697 |
| 2009/0273459 | A1 * | 11/2009 | Crave | G01P 1/08 |
| | | | | 340/441 |

(Continued)

*Primary Examiner* — Dale W Hilgendorf
*Assistant Examiner* — Alexander C. Bost

(57) ABSTRACT

The present subject matter relates to a vehicle mileage optimization system (300) for optimizing mileage of a vehicle by informing user about correct gear and speed combination. The vehicle mileage optimization system (300) has a speed and fuel measuring module (305) coupled with a processor (301) to collect speed and fuel data of the vehicle. Further, the vehicle mileage optimization system has a mileage and distance estimation module (306) coupled with the processor (301) to estimate fuel efficiency and correct gear and speed combination in the vehicle based on the collected speed and fuel data.

6 Claims, 23 Drawing Sheets

(51) Int. Cl.
  *B60W 30/14*   (2006.01)
  *B60W 40/105*  (2012.01)
  *B60W 50/02*   (2012.01)
  *B60W 50/00*   (2006.01)

(56) References Cited

U.S. PATENT DOCUMENTS

| | | | |
|---|---|---|---|
| 2013/0046449 A1* | 2/2013 | Yucel | F16H 61/0213 |
| | | | 701/51 |
| 2014/0005917 A1* | 1/2014 | Leggett | G06Q 10/00 |
| | | | 701/123 |
| 2014/0277835 A1* | 9/2014 | Filev | G06F 17/00 |
| | | | 701/2 |
| 2015/0197248 A1* | 7/2015 | Breed | G08G 1/167 |
| | | | 701/93 |
| 2015/0239454 A1* | 8/2015 | Sujan | F02D 29/02 |
| | | | 701/54 |
| 2016/0133065 A1* | 5/2016 | Baer | G01C 21/3469 |
| | | | 701/123 |
| 2017/0314679 A1* | 11/2017 | Verheijen | B60K 31/00 |
| 2018/0012489 A1* | 1/2018 | Nonoyama | G08G 1/09 |

* cited by examiner

| Speed (km/h) | 30 | 40 | 50 | 60 | 70 | 80 | 90 | 100 |
|---|---|---|---|---|---|---|---|---|
| Mileage (kmpl) | 20 | 23 | 27 | 25 | 22 | 18 | 16 | 13 |
| Gear | 3rd | 4th | 5th | 5th | 5th | 5th | 5th | 5th |

FIGURE 4E

Real time indicator 404

| Speed (km/h) | 30 | 40 | 50 | 60 | 70 | 80 | 90 | 100 |
|---|---|---|---|---|---|---|---|---|
| Mileage (kmpl) | 20 | 23 | 27 | 25 | 22 | 18 | 16 | 13 |
| Gear | 3rd | 4th | 5th | 5th | 5th | 5th | 5th | 5th |

FIGURE 4F

| | Speed (km/h) | 30 | 40 | 50 | 60 | 70 | 80 | 90 | 100 |
|---|---|---|---|---|---|---|---|---|---|
| 401 → | Speed (km/h) | 30 | 40 | 50 | 60 | 70 | 80 | 90 | 100 |
| 402 → | Mileage (kmpl) | 20 | 23 | 27 | 25 | 22 | 18 | 16 | 13 |
| 403 → | Gear | 3rd | 4th | 5th | 5th | 5th | 5th | 5th | 5th |
| 470 → | Distance to empty (km) | 100 | 115 | 135 | 125 | 110 | 90 | 80 | 65 |
| 480 → | Time to reach (Hours) | 2 | 1:30 | 1:12 | 1 | 00:55 | 00:50 | 00:45 | 00:40 |
| 490 → | No. Fuel stations on the way before vehicle fuel go empty | 1 | 2 | 3 | 2 | 2 | 1 | 0 | 0 |
| 495 → | Over speed Fine (Rs) | 0 | 0 | 0 | 0 | 0 | 0 | 0 | 1500 |

Assumed fuel volume left in vehicle fuel tank = 5 liters

FIGURE 5B

METHOD AND SYSTEM FOR OPTIMIZATION OF MILEAGE AND SPEED WITH RESPECT TO FUEL IN VEHICLE

CROSS-REFERENCE TO RELATED APPLICATIONS AND PRIORITY

The present application is a Continuation Application of a PCT application Number PCT/IB2017/053484 filed on Jun. 13, 2017 which claims priority from Application No. 201611031492 filed in India on Sep. 15, 2016, incorporated herein by a reference.

FIELD OF INVENTION

The present subject matter described herein, relates to a method and system for optimization of mileage and speed with respect to fuel in the vehicles, and, in particular, to provide information to the vehicle driver about the vehicle speed and proper gear selection to optimize fuel consumption. The present invention also deals with informing the driver/user about facilities e.g. fuel stations, hospitals, restaurants, mechanics, washrooms, etc., available on route till vehicle turns out of fuel. Further, the present invention also deals with providing additional informing to the driver/user about comparative fuel consumption and fine/penalty for over speeding on different routes.

BACKGROUND AND PRIOR ART

Fuel economy of a vehicle is significantly influenced by the way an operator selects gear and maintains vehicle speed Improper selection of gears as per the requirements creates rapid transitions in speed that will likely to effect the fuel efficiency of the vehicle. Generally, vehicle operators rely upon speedometers and tachometers to inform themselves of their vehicle's current operating condition, with fuel purchase patterns providing some measure of economy. Speed regulating systems are occasionally employed that compare actual vehicle speed to pre-set values and such systems can be somewhat effective in monitoring and controlling vehicle performance over a given course. Speed regulation is effectuated by regulating fuel flow to the vehicle's engine by detecting deviation from the set-speed and adjusting the fuel flow to reduce or eliminate the deviation. Further, selection of the gear with respect to speed of the vehicle effect mileage of the vehicle.

All automobiles run on some form of fuel, such as petrol, diesel, CNG, LPG, and battery. The distance travels by the automobile in one unit of fuel is known as its fuel efficiency (e.g., kmpl (Kilometer per litre), mpl (Miles per litre), mpg (miles per gallon) and other such fuel efficiency measuring units). Each vehicle has different fuel efficiency and their users adopt several methods to determine/judge the fuel efficiency of their vehicle. For example, some users calculate the fuel efficiency of their vehicle by noting down the distance travelled by their vehicle in fixed amount of fuel. By adopting this method, over a period of time, the user gets an idea about the fuel efficiency of his vehicle. Further, there are system which displays the information about fuel and distance which can be covered by the available fuel. This system calculates the speed based on the previous travel history of the vehicle.

Global positioning system (GPS) is a system which provides information like space, time, agriculture, weather, roads, etc., in general to a response to the user's requirements. In Automotive navigation systems, GPS provides some additional information to the user like speed, time, distance, etc. In order to get this information for example, current or past/journey's speed, distance to empty, etc., a user browses through the interface of automotive navigation system or GPS tracking system fitted inside the vehicle.

Since fuel efficiency is based on driving habits, speed gear combination, road/traffic conditions, and condition of vehicle at the operational stage, it can be improved by improving driving habits and keeping the vehicle in optimal health. If vehicles are maintained properly, the modern automobile will deliver designed optimal fuel efficiency if driven in a prescribed manner. There is no implementation which communicates suggested gear and optimum fuel efficiency simultaneously in a simple single deflection pointer/method.

Instantaneous mileage: Existing vehicles inform about instantaneous mileage by measuring the distance covered and corresponding fuel used in very short interval of time (say 2 seconds) and calculate the ratio of the two i.e., (distance÷time) i.e., kmpl (kilometer per litre). This instantaneous mileage in kmpl is displayed to the driver of the vehicle. Drawback of these systems is that they won't inform the driver about mileage at different speeds. For example, if a driver is driving at speed 70 km/h gets instantaneous mileage say 20 kmpl at this speed only. Driver won't get information about mileage at other speeds (say 100 km/h, 110 km/h). User will have to actually drive at (say 100 km/h, 110 km/h) to know about mileage at these speeds. User is forced to experiment at different speeds to know mileage at different speeds.

Still user may not be able to draw right conclusion as he/she may not have required skill to understand the non-linear nature of speed vs. mileage graph. It is time consuming also.

So, there is need to have a system which will inform the user about expected mileage at different speeds under standard conditions even when vehicle is at rest. This system to inform the user will allow him to pick speed of his choice to get desired mileage from his vehicle Distance to empty: Existing vehicles have feature of informing/displaying distance to empty. It is predicted/estimated on the basis of previous history and driving habit of driver in last few miles/km (say 100 km). As the driver opts to run his vehicle at new speed, estimation goes wrong. It creates confusion for driver. For example, if driver was driving with speed of 50 km/h in last 100 km, distance to empty indicated is say 150 km. But now driver decides to move at 100 km/h, his distance to empty will indicate a new reading (say 90 km). This fluctuation does not guide the driver to opt for a speed which gives maximum distance to empty.

So there is need to have a system which does not take into account the history or driving habit of driver. Rather it gives information about distance to empty when a vehicle is run at constant speed under standard conditions. For example, if a vehicle is run at 50 km/h at constant speed, it gives mileage of 27 kmpl and distance to empty is 135 km for 5 litre fuel available in tank.

Fuel stations on route: Existing system informs about the fuel stations nearby to the user or on the route followed by user. The system shows the name of the fuel station, its distance from the driver, and how to get there. There are some limitations of the existing systems. One of such limitation is that if a driver is driving on a particular route, then the existing system won't give information about the total number of fuel stations available on the remaining part of journey. For example, if there are say 4 fuel stations between the point of origin and point of destination. The existing system highlights all of the fuel stations on route but it doesn't tell the number of fuel stations available on remaining journey to be covered. For example, if a route has total 4 fuel stations in one journey. Driver has covered 80% of journey and it is possible that there is no fuel station available in pending path (20%) to be covered. It may lead to vehicle running out of fuel before it reached destination. At present, there is no display of numerical value of number of fuel pumps available on remaining part of journey.

So there is need to have a system which will inform the user about the total number of fuel station available on the remaining part of the journey.

Fuel stations on route as per the distance to empty at different speeds: As discussed earlier, existing system informs about the fuel stations nearby to the user or on the route followed by user. The system shows the name of the fuel station, its distance from the driver, and how to get there.

There are some limitations of the existing systems as it doesn't give information about the number of fuel stations available on the pending journey as per the distance to empty of vehicle if a driver is driving on a particular route. For example, if there are say 4 fuel stations between the point of origin and point of destination. The existing system only highlights all of the fuel stations on route but it doesn't give information about the number of fuel stations on route as per the distance to empty at different constant speeds. For example if driver is driving with speed of 80 km/h, the distance to empty at this speed is say 90 km and the number of fuel stations on remaining journey as per the distance to empty at current speed is 1. But now, driver decides to move at 50 km/h, the distance to empty at this speed is say 135 km and the number of fuel stations on remaining journey as per the distance to empty at current speed are 3. This information guides the driver to opt for a speed at which there are more number of fuel stations on remaining part of journey before traveling the distance to empty.

So there is need to have a system which take into account the values of distance to empty at each constant speed under standard conditions to calculate the total number of fuel station available on the remaining part of journey as per the distance to empty at each constant speed and gear combination.

Indian patent Application 3265/DEL/2013 discloses a device to be used in automobiles for indicating the measured value of speed along with pre-calibrated value of fuel efficiency and suggested gear number simultaneously using moving coil deflection meters or their equivalent display arrangements used for indicating speed, speed markings/calibrations used for measuring speed of vehicle, pre-calibrated fuel efficiency markings for giving fuel efficiency, optimal gear markings for suggested gear for the corresponding speed indicated by deflection of a single pointer. It suggests the driver to drive the vehicle at optimum speed to maximize fuel efficiency and minimize wear and tear of the vehicle along with warning beyond safe limits of speed in the given country/state. Further, this system too has drawback that it can be implemented on the analog speedometer. It is not suitable for the digital speedometer as digital meters indicate one set of values at one time.

In the known and existing prior arts, there no system or method which provides optimization of the fuel with respect to gear and speed of the vehicle simultaneously based on data obtained under standard conditions. Therefore, a simple and inexpensive method and system is required for optimization of the fuel efficiency. Therefore, there exists a requirement for a method and system having the ability to optimize various parameters of the vehicle to increase the fuel efficiency of the vehicle. This method can be standardized by vehicle operator/manufactures and conveyed to user. Further, the system which can easily guide the user to drive in a best manner such that overall performance of the vehicle is improved and the driver gets information about the mileage and proper gear selection at each speed under standard conditions. Furthermore, the system which gives information based on the available fuel that distance to empty if vehicle runs, under different speed, under different conditions, and different gears. At present there is no system to inform the user regarding number of fuel stations, hospitals, washrooms, restaurants etc. before the vehicle goes out of fuel. So, there is need to have a system to inform the user about number of fuel stations, hospitals, washrooms, restaurants etc. available for different speed patterns before vehicle goes out of fuel. Additionally, there is also no system which provides comparative information about fuel consumption on different routes to travel. If this information is provided, the user can opt for route with more specific intent. So, there is a need to have a system which provides comparative information about fuel consumption on different routes.

At present, three scales i.e. speed, Fuel efficiency and gear scale are available only on analogous speedometer which has fixed position in the vehicle. So, there is a need to have a system which display all these three scales in analogous and tabular display form on PDA to have flexibility of placement due to easy portability of PDA (Personal Digital Assistant) e.g. smart phones, tablets etc. Other aspects like 'time to reach', 'fuel to empty', 'fuel stations on route before fuel in vehicle goes empty', 'Fine/penalty on different speeds', 'upcoming hospitals, restaurants, washrooms, garages' etc. are also needed to be displayed in analogous and tabular form on PDA.

At present, needle of electromechanical device i.e. speedometer is being used to read three scales (speed, fuel efficiency and gear) simultaneously. There is a need to have a system which displays animated needle/pointer to have high reliability and easy substitution by another PDA in case of failure.

At present, all the three scales (speed, fuel efficiency and gear) formats and their calibration numeric are of fixed size and colour. There is a need to have a system in which scale formats and calibration numeric can be changed on PDA as per user convenience.

At present, retro-fitment of two scales (fuel efficiency and gear) on speedometer of old vehicle is difficult due to mechanical part removal and re-fitment thereof. In this process of retro-fitment, user may loose warranty/guarantee of speedometer/instrument panel. So there is a need to have a system in which all the scales and displays are on PDA and no retro-fitment problem is there.

OBJECTS OF THE INVENTION

The principal objective of the present invention is to optimize vehicle mileage by providing correct speed and gear combination information under standard conditions.

Yet another object of the present invention is to increase fuel efficiency of the vehicle by updating the user about appropriate speed and gear combination.

Yet another object of the present invention is to communicate suggested gear and optimum fuel efficiency simultaneously in a simple single deflection pointer/method.

Yet another object of the present invention is to inform the user about number of fuel stations, hospitals, washrooms, restaurants etc. available for different speed patterns before vehicle goes out of fuel.

Yet another object of the present invention is to provide comparative information about fuel consumption on different routes in a simple method.

Yet another object of the present invention is to provide information about fine/penalty for over speeding on different routes in a simple method.

Yet another object of the present invention is to display all these three scales (speed, fuel efficiency and gear) in analogous and tabular display form on PDA to have flexibility of placement due to easy portability of PDA (Personal Digital Assistant) e.g. smart phones, tablets etc. Other aspects like 'time to reach', 'fuel to empty', 'fuel stations on route before fuel in vehicle goes empty', 'Fine/penalty on different speeds', 'upcoming hospitals, restaurants, washrooms, garages' etc. are also needed to display in analogous and tabular display form on PDA.

Yet another object of the present invention is to have a system which displays animated needle/pointer to have high reliability and easy substitution by another PDA in case of failure.

Yet another object of the present invention is to have a system in which scale formats and calibration numeric can be changed as per user convenience.

Yet another object of the present invention is to have a system in which all the scales and displays are on PDA and no retro-fitment problem is there for old vehicles.

SUMMARY

The present subject matter relates to a vehicle mileage optimization system for optimizing mileage of a vehicle by informing user about correct gear and speed combination. The vehicle mileage optimization system has a speed and fuel measuring module coupled with a processor to collect speed and fuel data of the vehicle. Further, the vehicle mileage optimization system has a mileage and distance estimation module coupled with the processor to estimate fuel efficiency and correct gear and speed combination in the vehicle based on the collected speed and fuel data. Further, along with speed and fuel measuring module and the mileage and distance estimation module, the vehicle optimization system has a GPS data processing module coupled with the processor to estimate the number of fuel stations, hospitals, washrooms, restaurants and other facilities available for different speed patterns before vehicle goes out of fuel. Further, with speed and fuel measuring module the system provides comparative information about fuel consumption on different routes.

In order to further understand the characteristics and technical contents of the present subject matter, a description relating thereto will be made with reference to the accompanying drawings. However, the drawings are illustrative only but not used to limit scope of the present subject matter.

BRIEF DESCRIPTION OF THE DRAWINGS

FIGS. 4d and 4f illustrates an exemplary system for implementing aspects of present invention where instantaneous speed is available through a pointer/indicator, in accordance with an embodiment of the present subject matter;

FIG. 5b illustrates a possible method to represent the aspects of present invention where data tested under standard conditions, derived data, and instantaneous data is available, in accordance with an embodiment of the present subject matter;

DETAILED DESCRIPTION OF THE DRAWINGS

Figure 1A:
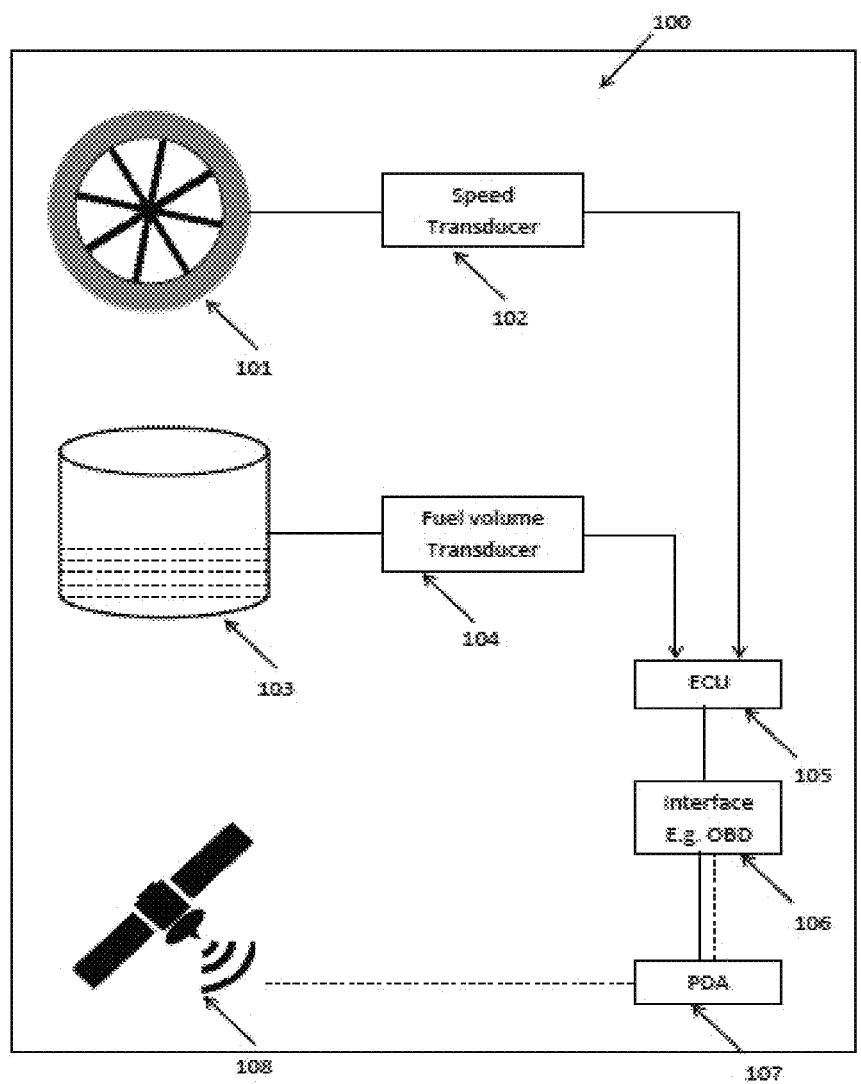
FIG. 1a schematically depicts an arrangement of hardware components by using which an embodiment of the present subject matter may be implemented, in accordance with an embodiment of the present subject matter.

Present subject matter relates to a system and method for optimization of mileage of the vehicle. The present vehicle mileage optimization system determines the correct relation between mileage, speed and the gear of the vehicle. The present system is in communication with Electronic Control Unit (ECU) of the vehicle to receive information about the instantaneous speed and fuel left in the vehicle. Based on the received information, the present system determines the distance which can be covered by the vehicle at different speed and gear combinations along with time to reach the destination under standard conditions. Further, if the Global positioning system (GPS) of computing device is ON, the present system calculates number of petrol pump on the way before the fuel go empty. As per the present system, operator of the vehicle gets dynamic data of the vehicle and relation between the speed and gear. For better optimization of the fuel efficiency, the operator operates the vehicle at best combination of the speed and gear as the standard speed vs. mileage vs. gear data guides the user to opt for desired speed.

Further, along with speed and fuel measuring module and the mileage and distance estimation module, the vehicle optimization system has a GPS data processing module coupled with the processor to estimate the number of fuel stations, hospitals, washrooms, restaurants and other facilities available for different speed patterns before vehicle goes out of fuel. Further, with speed and fuel measuring module the system provides comparative information about fuel consumption on different routes.

It should be noted that the description and figures merely illustrate the principles of the present subject matter. It should be appreciated by those skilled in the art that conception and specific embodiment disclosed may be readily utilized as a basis for modifying or designing other structures for carrying out the same purposes of the present subject matter. It should also be appreciated by those skilled in the art that by devising various arrangements that, although not explicitly described or shown herein, embody the principles of the present subject matter and are included within its spirit and scope. Furthermore, all examples recited herein are principally intended expressly to be for pedagogical purposes to aid the reader in understanding the principles of the present subject matter and the concepts contributed by the inventor(s) to furthering the art, and are to be construed as being without limitation to such specifically recited examples and conditions. The novel features which are believed to be characteristic of the present subject matter, both as to its organization and method of operation, together with further objects and advantages will be better understood from the following description when considered in connection with the accompanying figures.

These and other advantages of the present subject matter would be described in greater detail with reference to the following figures. It should be noted that the description merely illustrates the principles of the present subject matter. It will thus be appreciated that those skilled in the art will be able to devise various arrangements that, although not explicitly described herein, embody the principles of the present subject matter and are included within its scope.

FIG. 1a schematically depicts network architecture 100 for implementing Vehicle Mileage Optimization System (VMOS), according to an embodiment of the present subject matter. In said embodiment, the network 100 includes one or more vehicle wheel(s) or other speed proportional rotating part 101, speed transducer(s) 102, fuel tank 103, fuel volume transducer(s) 104, an ECU (Electronic Control Unit) 105, a tool 106 to interface with ECU (e.g. OBD (On Board Diagnostics)), a PDA (personal digital assistant) 107 (e.g. Smartphone, tablet computer, GPS receiver, etc. or other handheld device or non-portable devices (e.g. automotive navigation system, desktop computer etc.) with combination of such features) and a GPS tracking system The present embodiment may use all of the components of the system or any combination thereof, to enable the system to perform the desired functions. In an exemplary embodiment of the present invention the system first collects the values of speed and fuel volume left in the vehicle the using the transducers which help system to get values from the respective components. For example, here in given embodiment, the speed transducer(s) 103 gets the value of speed from the rotation of wheel 101 and fuel volume transducer 104 gets the value of fuel volume left in the fuel tank of the vehicle 103. The values which are fetched by various transducers are then sent to the ECU 105 of the vehicle. The values stored in ECU 105 can be communicated to the PDA 106 through an interface (106) which is compatible with the protocols of the ECU. The connection between the ECU and PDA can be established through wired or wireless (Bluetooth, WI-Fi etc.) medium. Generally an OBD interface is used to connect with the ECU and to fetch the values stored/processed by it. In addition to the values obtained from an ECU, a PDA can also be coupled with the GPS tracking system 108 which can be used to get information about the journey route options, Distance, Speed, information about position of Fuel stations, hospitals, washrooms, restaurants, garages, etc. The information collected from ECU and GPS tracking system will be then processed by the PDA and will give results which will help the driver to optimise the mileage and speed with respect to the fuel left in the vehicle. The PDA will also inform the driver about other facilities e.g. Fuel stations, hospitals, restaurants, washrooms, etc.

Figure 1B:
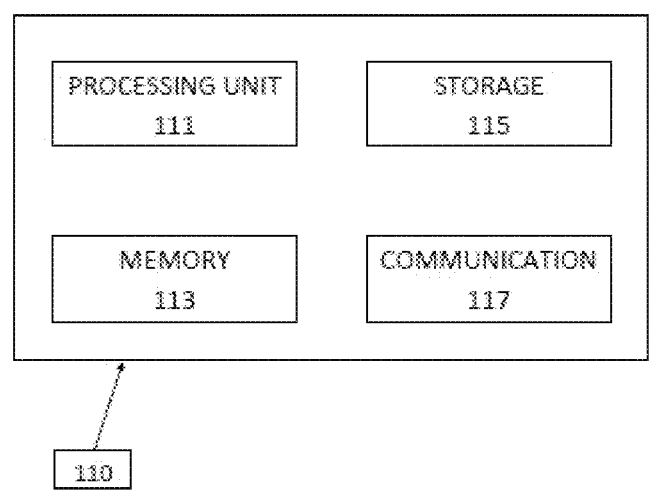
FIG. 1b schematically depicts a computing device in which an embodiment of the present subject matter may be implemented, in accordance with an embodiment of the present subject matter.

FIG. 1B schematically depicts a computing device 110 in which an embodiment of the present subject matter may be implemented. In its most basic configuration, the computer device or the PDA 107 includes at least one processing unit 111, a memory 113, and storage unit 115. The processing unit 111 includes at least one Central Processing Unit (CPU) and it may also include a Graphics Processing Unit (GPU). The memory 113 can be volatile or non-volatile, or some combination of the two. In addition to this, the device includes a storage unit 115 which includes a removable or non-removable storage including, but not limited to, magnetic or optical disks or tape, as well as writable electrical storage media. Additionally, the device may also include additional communication connections 117 that allow the device to communicate with other devices (e.g. other computing devices) through wired and/or wireless media.

A computer-readable media may include both storage and communication media. Communication media may encapsulate computer-readable instructions, data structures, program modules or other form of data communicated through modulated signals such as a carrier wave or any other information transport mechanism. A communication medium may include wired media such as fiber optics, telephone network, internet network etc. and wireless media such as radio, Bluetooth, infrared, Wi-Fi, etc.

In addition to implementation on a self-contained computing machine, embodiments of the invention can also be implemented on a network system which consists of a plural number of computing devices that are in communication with each other with a networking means, such as a network with infrastructure or an ad hoc network. The network may be connected with wired, or a wireless, or a combination of both.

Figure 2:
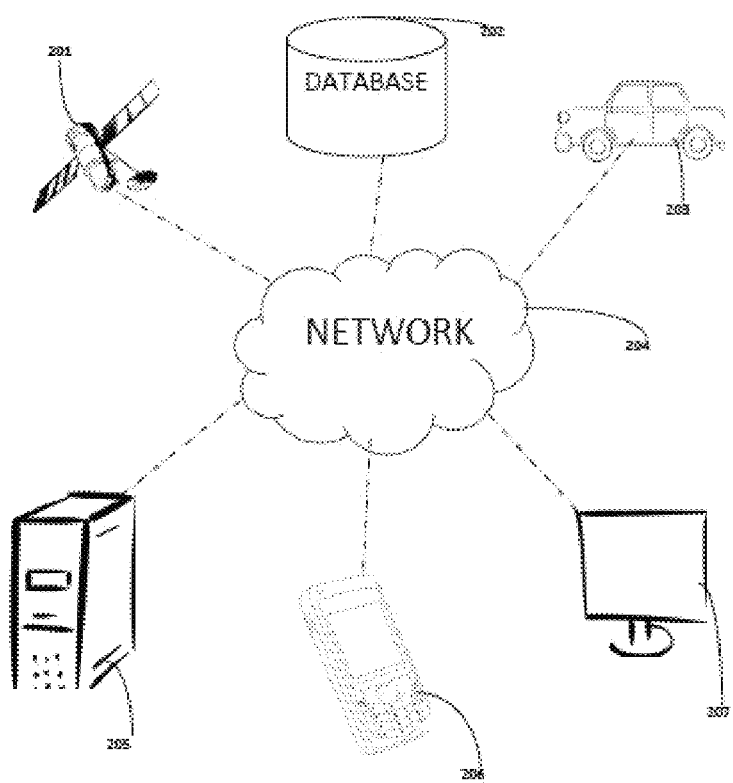
FIG. 2 schematically depicts a network system with an infrastructure in which embodiments of the present subject matter may be implemented, in accordance with an embodiment of the present subject matter.

As an example, FIG. 2 illustrates a network system with an infrastructure or an ad hoc network in which embodiments of the present subject matter may be implemented. In this example, the network system comprises a GPS (Global positioning System) 201, a Database server 202, Computer 205, a network connections means 204, computer/display terminal 207 and PDA (Personal Digital Assistant) 206 (same as 106 in the FIG. 1a) (e.g., Smartphone, tablet computer, GPS receiver, etc., or other handheld devices or non-portable devices (e.g. automotive navigation system, desktop computer etc.) with combination of such features). Additionally, the network may comprise an automobile ECU 203 (electronic control unit) for other features and/or functionality. The Embodiments of the invention may be implemented in any of these devices which comprise basic components, such as a processor, memory, storage, and communication connection. The present embodiment may use all of the devices of the system or any combination thereof, to enable the system to perform the desired functions. For example, the execution of the instructions or other desired processing maybe performed on the any of the computing device 203, 205, and 206. Alternatively, an embodiment of the invention may be performed by utilizing functionalities of different computing devices of the network system and output can be obtained on a single system. For example, execution of certain desired instructions or other desired processing maybe performed on one of the computing devices of the network (e.g. computer 205) and other processing/execution of the instruction may be performed at another computing device (e.g. PDA 206) of the network system. In another example, certain processing/execution of the instruction may be performed at one computing device (e.g. computer 205) and other part of the instruction maybe processed/executed at different computing device that may or may not be networked. For example, certain processing may be performed at ECU 203, while the other processing may be done by PDA 206 and the result maybe passed to computer 205, where it may be stored in the storage media 105 (FIG. 1b) and can be distributed to other systems in a form of disk, electronic copy or other storage media.

Figure 3:
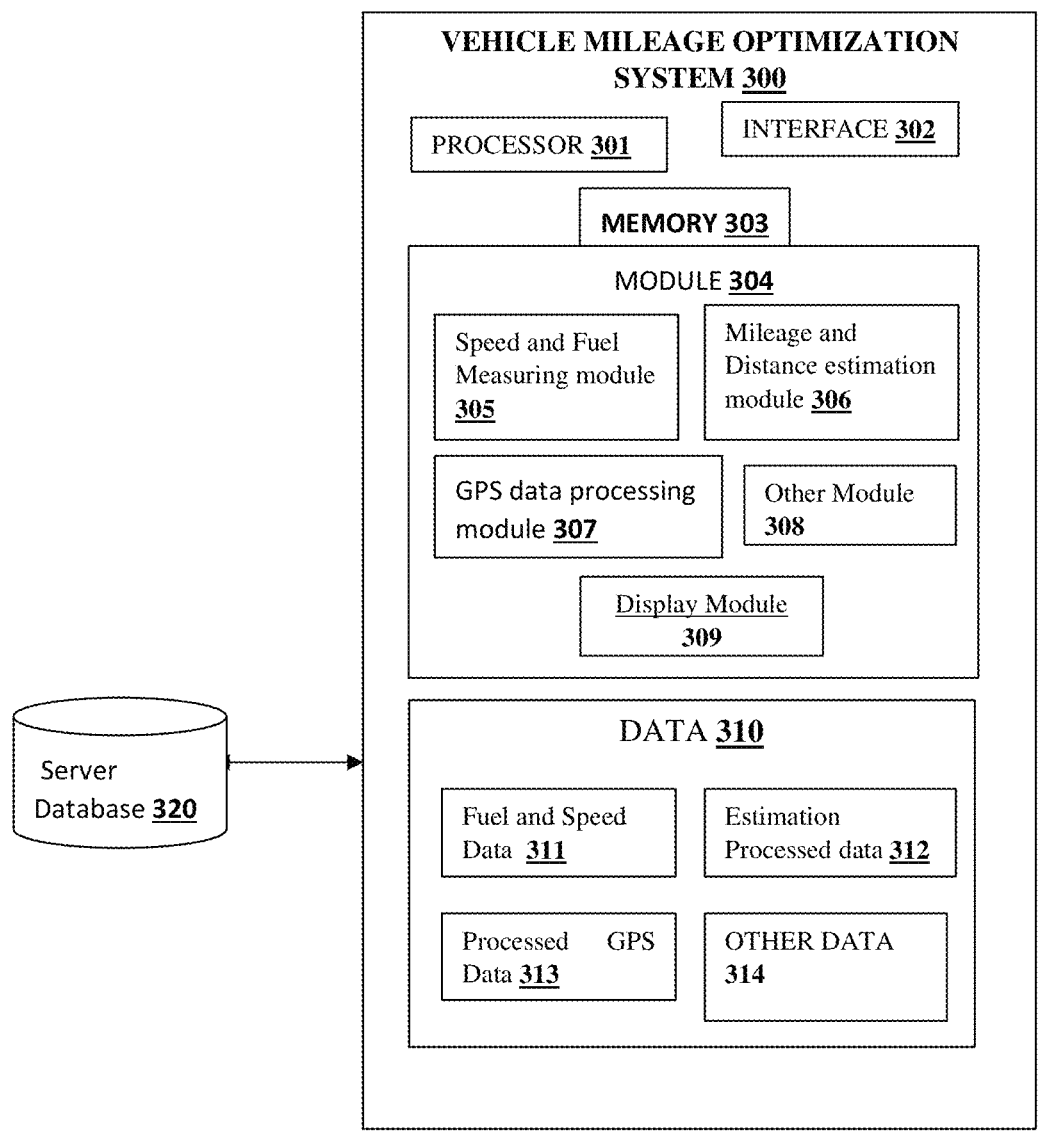
FIG. 3 illustrates a computing system for implementing the present invention, in accordance with an embodiment of the present subject matter.

For instance, FIG. 3 illustrates architecture of a computing system. FIG. 3 illustrates components of Vehicle Mileage Optimization System (VMOS) 300 (herein after it may be referred as VMOS system), according to an embodiment of the present subject matter. In said embodiment, the VMOS system 300 includes one or more processor(s) 301, interface(s) 302, and a memory 303 coupled to the processor 301. The processor(s) 301, may be implemented as one or more microprocessors, microcomputers, microcontrollers, digital signal processors, central processing units, logic circuitries, and/or any devices that manipulate signals based on operational instructions. Among other capabilities, the processor(s) 301 is configured to fetch and execute computer-readable instructions stored in the memory 303.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 302 may include a variety of software and hardware interfaces, for example, interfaces for peripheral device(s), such as a keyboard, a mouse, and an external memory. Further, the interfaces 302 may facilitate multiple communications within a wide variety of protocol types including, operating system to application communication, inter process communication, etc. The memory 303 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the VMOS system 300 may include module(s) 304 and data 310. The modules 304 and the data 310 may be coupled to the processor(s) 301. The modules 304, amongst other things, include routines, programs, objects, instructions stored in the memory 303 components, data structures, etc., which perform particular tasks or implement particular abstract data types. The modules 304 may also be implemented as, signal processor(s), state machine(s), logic circuitries, and/or any other device or component that manipulate signals based on operational instructions. In another aspect of the present subject matter, the modules 304 may be computer-readable instructions which, when executed by a processor/processing unit, perform any of the described functionalities. The machine-readable instructions may be stored on an electronic memory device, hard disk, optical disk or other machine-readable storage medium or non-transitory medium. In one implementation, the computer-readable instructions can be also be downloaded to a storage medium via a network connection.

In an implementation, the module(s) 304 includes a Speed and fuel measuring module 305, Mileage and distance estimation module 306, a GPS data processing module 307, display module 309, and other module(s) 308. The other module(s) 308 may include programs or coded instructions or standard data e.g. (speed vs. mileage vs. gear) that supplement applications or functions performed by the VMOS system 300. The data 310 includes Fuel and speed data 311, Estimation processed data 312, processed GPS data 313, and other data 314. The other data 314 amongst other things, may serve as a repository for storing data that is processed, received, or generated as a result of the execution of one or more modules in the module(s). Although the data 310 is shown internal to the VMOS system 300, it may be understood that the data 310 can reside in an external repository, such as cloud server (not shown in the figure), which may be coupled to the VMOS system 300. Further, the VMOS system 300 is in communication with the external repository or database 320 through the interface(s) 302 to obtain information from the pre-stored data.

The speed and fuel measuring module 305 receives information about the speed and the fuel left in the vehicle through ECU. The VMOS system 300 is in connection with the ECU through wire or wireless, such as Bluetooth. The speed and fuel measuring module 305 stores the received data in the fuel and speed data 311. The mileage and distance estimation module 306 receives the speed and fuel data 311 and estimate the mileage of the vehicle in respect the speed and gear combination by using speed vs. mileage vs. gear data under standard conditions. Further, the mileage and distance estimation module 306 displays the estimated information about the speed, gear, mileage and distance to empty on the display device of the computing device using display module 309. The display module is in communication with the mileage and distance estimation module 306 to display the calculated data and information on the display screen of the computing device. The speed and fuel measuring module 305 along with distance and mileage estimation module 306 calculates the time to reach destination at different speeds. The GPS data processing module 307 is communicable connected with the mileage and distance estimation module 306. The GPS processing module 307 receives the position coordinates of the communicating device on regular basis. To receive the position coordinates, the GPS device of the communicating device should be open throughout. Upon receiving the position coordinates, the GPS processing module 307 sends the calculated information to the display module 309 for displaying on the computing device.

The display module 309 is coupled with the speed and fuel measuring module 305, mileage and distance estimation module 306 and GPS data processing module 307. The display module 309 is used to display speed, mileage, gear, distance to empty, time to reach, no. of fuel stations on the way before vehicle fuel go empty, over speed fine in as illustrated in the FIG. 5B, Route options with time and fuel saving/loss comparison as illustrated in the FIG. 6B, a method to display speed, fuel efficiency and gear with/without a needle/indicator to indicate instantaneous parameters as illustrated in FIG. 4c, FIG. 4d, FIG. 4e and FIG. 4f are all displays the information to the user using the display module 309 which is in communication with other module to receive the information for display. A method to display number of fuel stations ahead before destination as illustrated in FIG. 5g is also displayed on the display screen of the computing device using the display module 309.

Further, the user inserts the desired location in the computing device. Based on the inserted information, the display module 309 sends the inserted information to the mileage and distance estimation module 306 to determine the number of fuel stations on the selected path and displays the information to user on the computing device using the display module 309. Further, the mileage and distance estimation module 306 determine how many number of fuel stations are present before the fuel go empty. More detail of the implementation of the system is explained below.

Figure 4A:
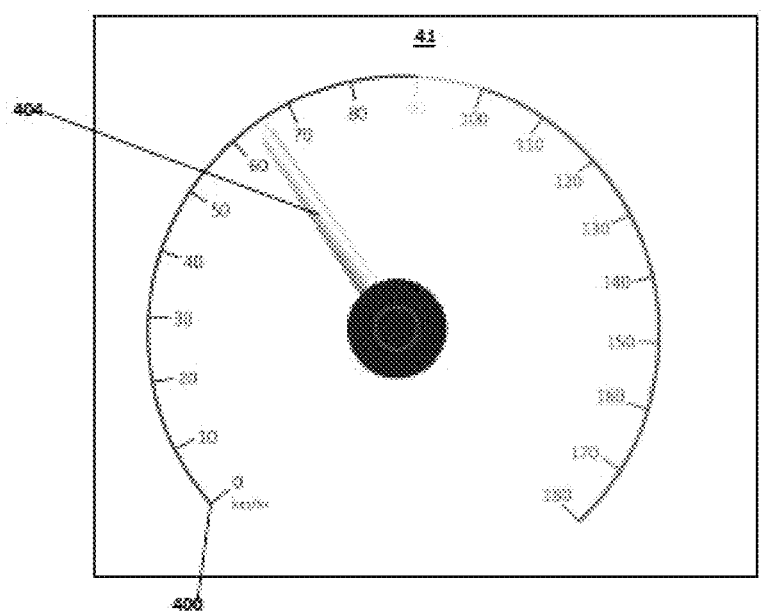
FIG. 4a illustrates an exemplary system for representing a method to indicate instantaneous speed in an analog arrangement in a display device, in accordance with an embodiment of the present subject matter.

FIG. 4a shows an exemplary illustration of traditional method 41 to display speed of a vehicle on a speedometer. The arc 400 represents a circular scale on which certain values of speed are written in a particular arrangement. The speed of a vehicle is measured in various units, for example, km/h (Kilometer per hour), mph (Miles per hour), knots and other such speed measuring units. Traditionally, the instantaneous value of speed is measured by an ECU (electronic control unit) fitted inside the vehicle or is measured by the GPS. The value of instantaneous mileage is then indicated on the speedometer with the help of a real time pointer/indicator 404 (e.g. needle). For example, in one instance where the display of speedometer is analog (FIG. 4a), if a vehicle is running at a speed of 60 km/h, then the ECU or/and GPS will measure the instantaneous speed and the needle 404 present in the speedometer will move to the position where the value 60 km/h is written.

Figure 4B:
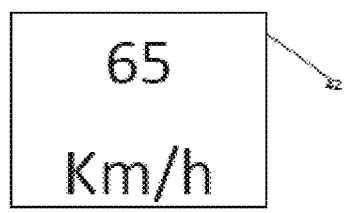
FIG. 4b illustrates an exemplary system, representing traditional method to indicate instantaneous speed in an digital arrangement.

In another instance, a method 42 is illustrated in FIG. 4b, where display of speedometer is digital, the instantaneous speed value is shown digitally on speedometer as an integer (e.g. 65 km/h or any other value).

Figure 4C:
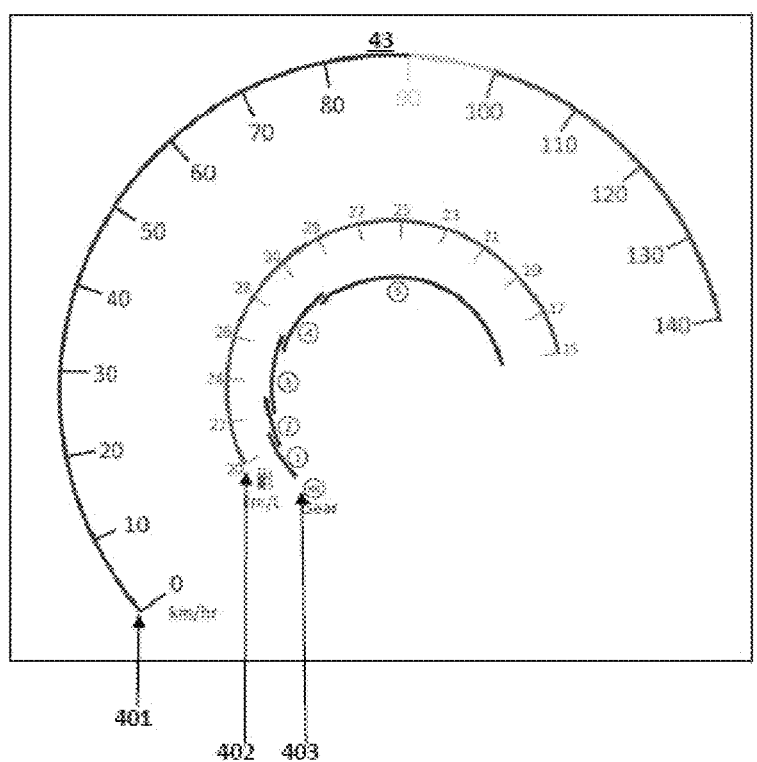
FIG. 4c (Analogous circular scale) and FIG. 4e (Tabular form of 4c) illustrate an exemplary system for representing aspects of present invention where instantaneous speed detection/indication is not available, in accordance with an embodiment of the present subject matter.

In FIG. 4c, illustrates an embodiment of the present invention in which the mileage or fuel efficiency scale 402 is marked along with the speed scale 401. The mileage of a vehicle is measured under standard conditions and is measured in various units, such as kmpl (Kilometer per litre), mpl (Miles per litre), mpg (miles per gallon) and other such fuel efficiency measuring units. The fuel efficiency scale 402 is marked in such a way that it represents a value corresponding to each speed. Further, the present invention displays the fuel efficiency scale corresponding to selected vehicle in the display of the computing device. Further, the present VMOS system 300 with the help of display module 309 displays the gear selection scale 403 along with the fuel efficiency scale 402. The gear selection scale 403 guides the driver to drive the vehicle in the particular gear to get the better fuel efficiency and better mileage optimization. Based on the indication, the operator of the vehicle selects the speed and gear combination.

Figure 4D:
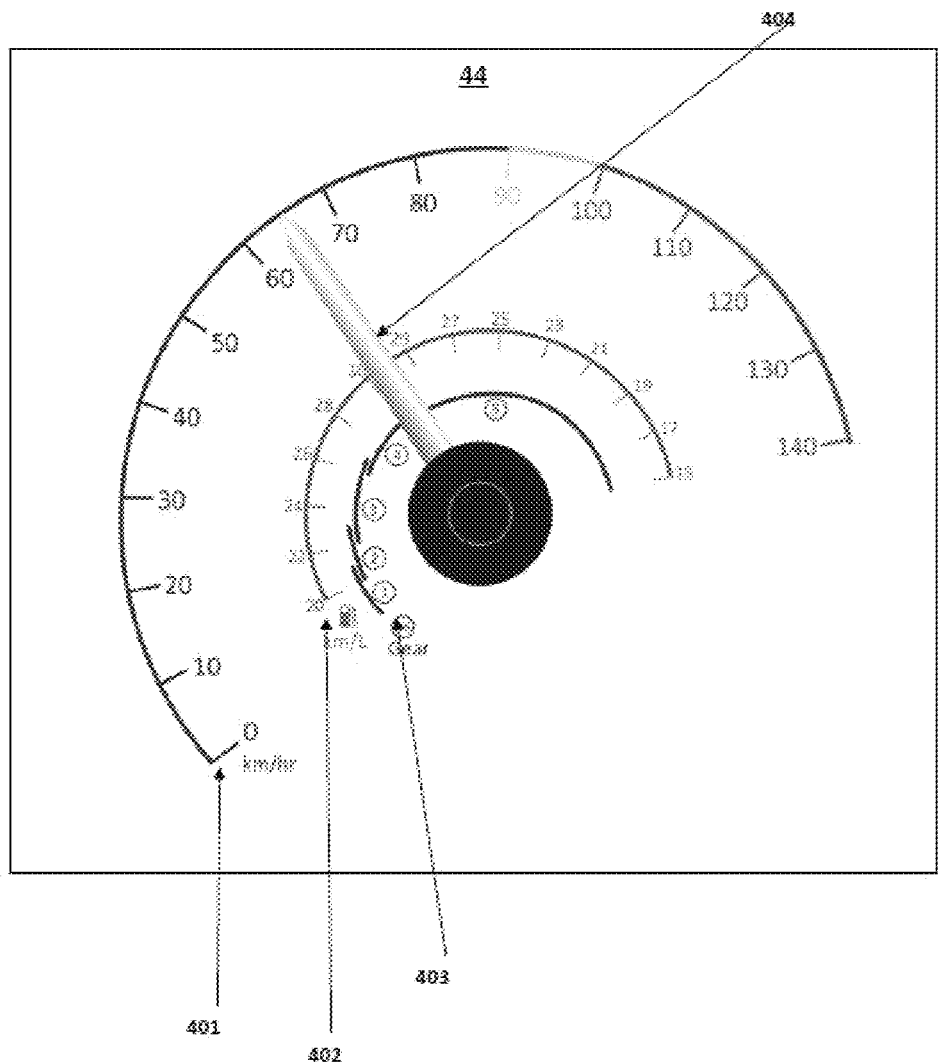

In FIG. 4d, the method 44 depicts the system where a real-time indicator/pointer (e.g. needle) is used to indicate various parameters like speed, fuel efficiency, gear etc. When needle 404 is at any angular position ($\theta$), needle points speed on speed scale 401 and indicate fuel efficiency in km/hr on fuel efficiency scale 402. For example, in FIGS. 4c and 4d, a fuel efficiency of 29 kmpl is marked corresponding to the speed 70 km/h. It indicates that if vehicle is driven at a constant speed of 70 km/h it will give a fuel efficiency of 29 kmpl as tested under standard conditions. And similarly, other values of the scale can be interpreted.

In addition to the fuel efficiency or mileage scale 402 which is displayed on the screen of the computing device using display module 309, another aspect of the present invention is a gear scale 403 which is marked corresponding to the speed scale 401. The value of gear scale 403 corresponding to speed scale 401 represents the correct gear which should be used at a particular speed and also represents the speeds at which the gears should be shifted from low to high and vice versa. For example, in FIGS. 4c and 4d, a gear number 5 is marked corresponding to the speed from 60 km/hr and above. It indicates that the vehicle should be driven in $5^{th}$ gear while running at speed of 60 km/hr and above. Additionally, if speed of a vehicle is being reduced to 50 km/h from 70 km/h, then it indicates that the gear should be shifted to $4^{th}$ gear or vice versa, as $4^{th}$ gear corresponds to speed scale of range of 45 km/hr to 60 km/hr in given example.

FIGS. 4e and 4f represents a system where the above said information about speed, fuel efficiency and gear is given in a tabular format 45 and 46. Here in FIG. 4e, method 45 represents tabular form of information given in method 43 in FIG. 4c and in FIG. 4f, method 46 represents tabular form of information given in method 44 in FIG. 4d.

Altogether, the VMOS system 300 indicates various parameters which can be tested under standard conditions, such as fuel efficiency at different constant speeds, correct gear to be used at a given speed.

It should be appreciated that various aspects of the invention may be combined to include any or portion thereof or all of the various embodiments previously described. For example, an embodiment of the present invention as depicted in FIGS. 4c, 4d, 4e and 4f incorporates 401, 402, and 403. In an exemplary arrangement, any combination of 401, 402, and 403 can be represented, such as 401, 402, and 403 or vice versa. In some embodiments, a portion of any of the embodiments can be shown instead of all.

In present embodiment, the methods 43, 44, 45, and 46 as depicted in FIGS. 4c, 4d, 4e, and 4f are methods of educational tool which teaches the user/driver to run ones vehicle in a manner to get optimum fuel efficiency by informing him/her about the mileage at each speed under standard running conditions. Further, all the information about the vehicle is displayed on the screen of the computing device using display module 309.

It should be appreciated that the embodiments of the method 43, 44, 45, and 46 can also be displayed in the case where the vehicle is at rest, i.e., by using current invention, i.e., using current invention; user can gain knowledge of fuel efficiency at different speeds as and when he will run the vehicle under standard conditions. It will help the user to compare various vehicles fuel efficiency at different speeds and user can pick best vehicle as per one's speed habit.

In addition to the above said description, it should be appreciated that in the traditional method 41 (FIG. 4a) to display speedometer using the display module 309, the arrangement of speed values 400 doesn't indicate the maximum speed of a vehicle. The problem with the above said system is that the given information of speed ranging from zero to maximum is misleading. The maximum speed marked on speedometer is much higher than maximum rated speed of vehicle design.

An aspect of an embodiment of the present invention, as depicted in FIG. 4c, is a method 43 of displaying other parameters of a system (e.g. speed, fuel efficiency, gear etc.). This method 43 depicts an arrangement of speed scale 401, Mileage scale 402, and gear scale 403. In this method 43, the values of speed scale 401 are limited to 140 km/h only rather than 180 km/h as compared to values given in Speed scale 400 of FIG. 4a. In this exemplary system, the value 140 km/h represents a maximum speed that can be attained by that vehicle under any real circumstance.

In the above discussed methods 43 (FIG. 4c), 44 (FIG. 4d), 45 (FIG. 4e), and 46 (FIG. 4f) of the present invention, the invention explains about the methods and uses of displaying fuel efficiency of a vehicle 402 (tested under standard condition) and suggesting correct gear to be used 403 with the different speeds of vehicle.

Figure 4G:
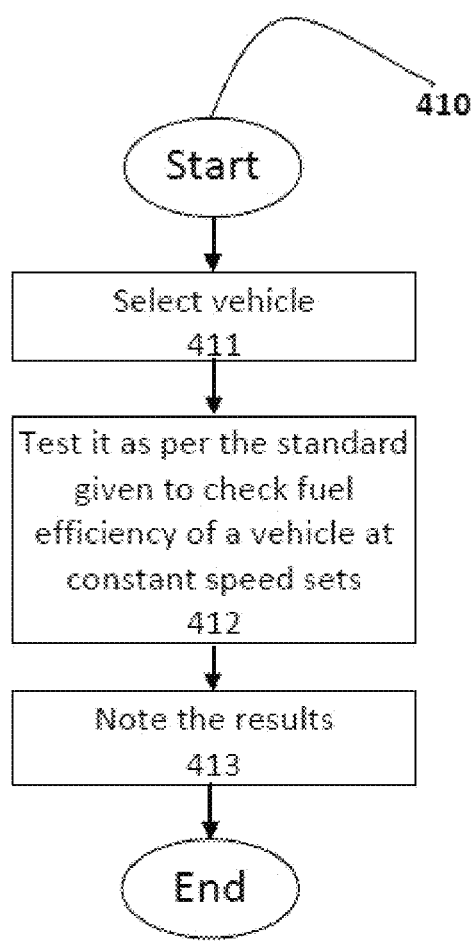
FIG. 4g illustrates a method to calculate fuel efficiency and correct gear for a vehicle at different speeds under standard conditions, in accordance with an embodiment of the present subject matter.

The FIG. 4g illustrates an exemplary method 410 to check or calculate the values of fuel efficiency and correct gear to be used at different speeds for a particular vehicle. At step 411, initially the VMOS system needs to select a vehicle for which the values are needed to be calculated. After selecting the vehicle, at step 412, the user or manufacturer will follow the standard instructions and given parameters to test its fuel efficiency and correct gear at different speeds. Here to check the fuel efficiency of a vehicle at constant speeds, the user or manufacturer may follow the standards defined by an authoritative body or an organization and the gear values can be checked by using some another standard method defined for checking correct gear values. After performing the tests as per the standard, the user or manufacturer will note down the test results (step 413). Now, these test results will give the values of fuel efficiency and correct gear for a vehicle at different speeds.

Figure 5A:
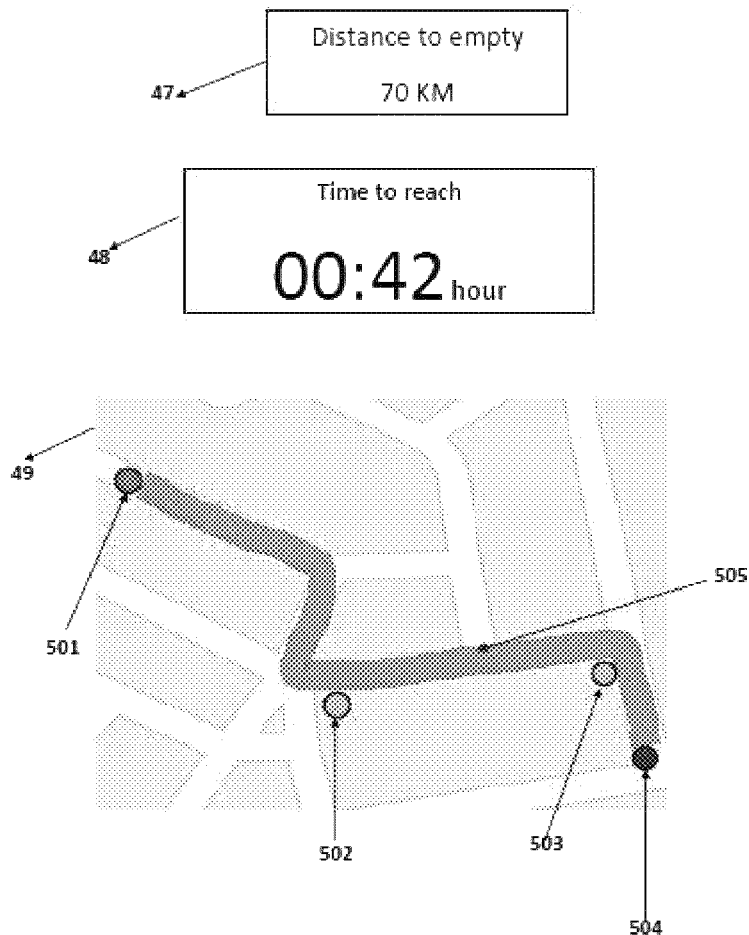
FIG. 5a illustrates an exemplary system, representing traditional method to indicate 'Distance to empty', 'Time to reach' and 'Fuel stations on-route', in accordance with an embodiment of the present subject matter.

FIG. 5a illustrates various methods, i.e., 47, 48 and 49 which illustrates the existing methods to display various parameters. Method 47 here illustrates existing method to display the 'distance to empty' feature of automobiles. In this method, the system analyzes the distance to empty by calculating the average speed of user, average fuel efficiency obtained by user (checked by analyzing the past journey) and the fuel left inside the fuel tank.

Method 48 here illustrates existing method to display the time left to reach the destination. In this method, the system analyzes the time to reach by calculating the average speed of user (checked by analyzing the past journey) and the distance left to reach the destination. Here, the system may be in communication with a virtual navigation system (e.g. Map) to get the desired data about distance left.

Method 49 here illustrates existing method to display various on-route fuel stations before reaching to the destination. In this method, the user enters his point of destination 504 and also urges to know the on-route or nearest fuel stations. The system then searches for the nearest/on-route fuel station(s) in the database by checking the current position 501 and route 505 of the user and searching fuel station(s) that lies within a certain distance from the current position of user or by searching for fuel stations whose position co-ordinates lies on-route which is currently being followed by the user. At the end of the search, if system found any results, then it displays it on the virtual navigation system which is being used by user. Here 502 and 503 represents the fuel stations that or on-route to the user.

In the methods illustrated in FIG. 5a i.e. 47, 48, and 49, the system checks for the solution by taking into consideration the past journey behavior of the user. These solutions are neither calculated in standard conditions nor using data for calculations which is tested under standard conditions. As will be appreciated, the problem with these solutions is that the user is unable to learn anything or modify his driving so as to get better results.

As a solution to this, the method 50 in FIG. 5b gives an alternate and advanced way to calculate and display above said parameters. In method 50 the VMOS system calculates results by using values which are tested under standard conditions and displays result corresponding to each particular speed simultaneously. For example, in solution 470 of method 50, the Mileage and distance estimation module 306 of VMOS system 300 calculates results for 'distance to empty' at each speed. Here the VMOS system uses values of speed, Fuel efficiency at each speed (tested under standard conditions) and fuel left in fuel tank to calculate results. An exemplary flow of instructions used to calculate method 470 is depicted in FIG. 5c.

Figure 5C:
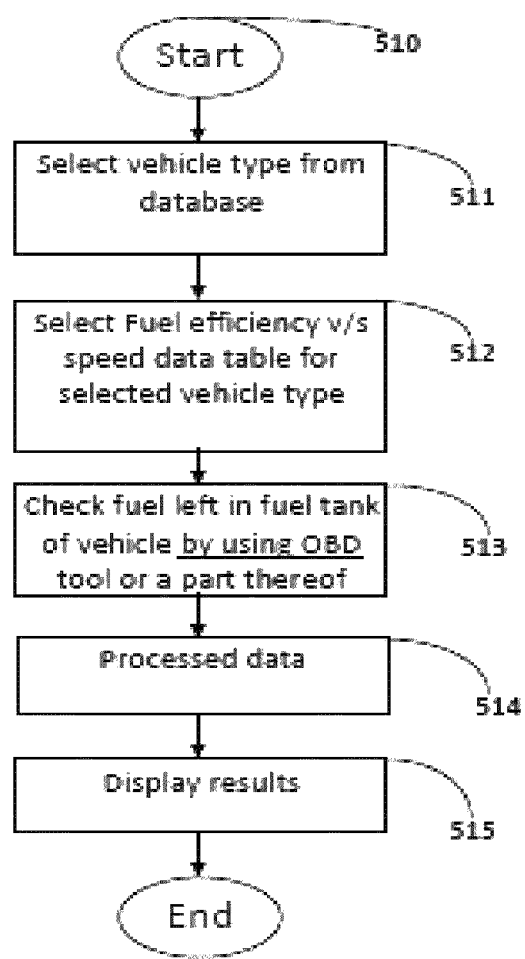
FIGS. 5c, 5d, 5e, 5f, and 5h illustrate methods for embodying aspects of the present subject matter, in accordance with an embodiment of the present subject matter.

In FIG. 5c, in the method 510, the VMOS system will first select the vehicle which is currently being driven 511 from the server database 320. At step 512, the VMOS system will select the mileage of that vehicle at different speeds (tested under standard conditions) from the database 320. At step 513, the VMOS system 300 will get information about the fuel left in the fuel tank from the ECU of that vehicle by using OBD tool. After having all this information, at step 514, the VMOS system 300 estimates the distance which would be covered by that vehicle before it goes empty. At step 515, the VMOS system displays results to the user using the display module 309 on the computing device. Exemplary results are shown in FIG. 5b by method 470.

Figure 5D:
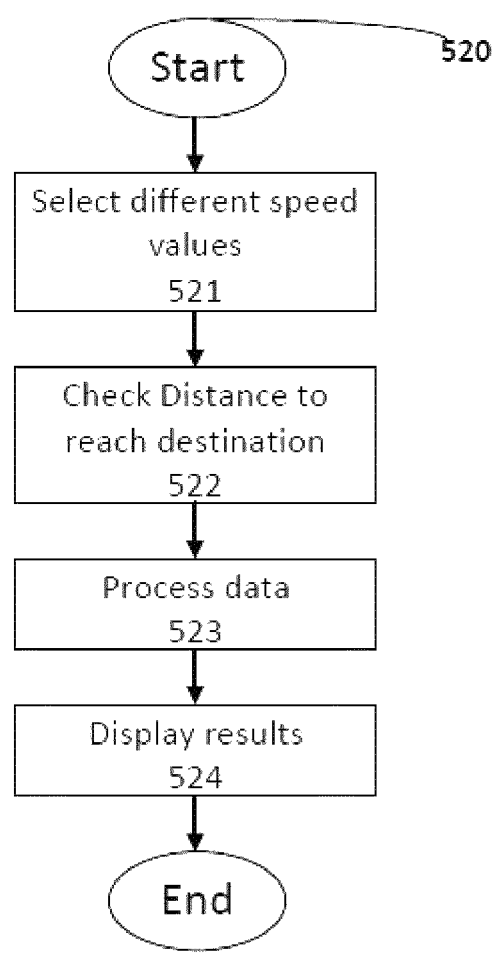

In solution 480 of method 50 of FIG. 5b, the mileage and distance estimation module 306 of the VMOS system calculates results for 'Time left to reach destination' at each speed. Here the VMOS system uses multiple values of speed and the distance left to reach the destination to calculate results. An exemplary flow of instructions used to calculate solution 480 is depicted in FIG. 5d. In the method 520 of FIG. 5d, the VMOS system first selects the multiple values of speed at step 521. At step 522, the VMOS system checks for the distance remaining to reach to the destination. At step 522, the VMOS system can use virtual navigation system and GPS (e.g. Map) to check for the distance between current position/point of origin and the point of destination. After having all this information, at step 523, the VMOS system will calculate the time to be taken to reach to the destination if driven at different speeds. At step 524, the VMOS system will display results to the user using the display module 309 on the computing device. Exemplary results are shown in FIG. 5b by method 480.

In solution 490 of method 50 of FIG. 5b, the mileage and distance estimation module 306 of the VMOS system 300 calculates results for 'Number of fuel stations on remaining journey before the fuel go empty' at each speed. Here the VMOS system 300 uses multiple values of speed, Fuel efficiency at those values of speed (tested under standard conditions), fuel left in fuel tank, current position and destination of user, route which is being followed by user and the information about fuel stations present on route which is being followed by user.

Figure 5E:
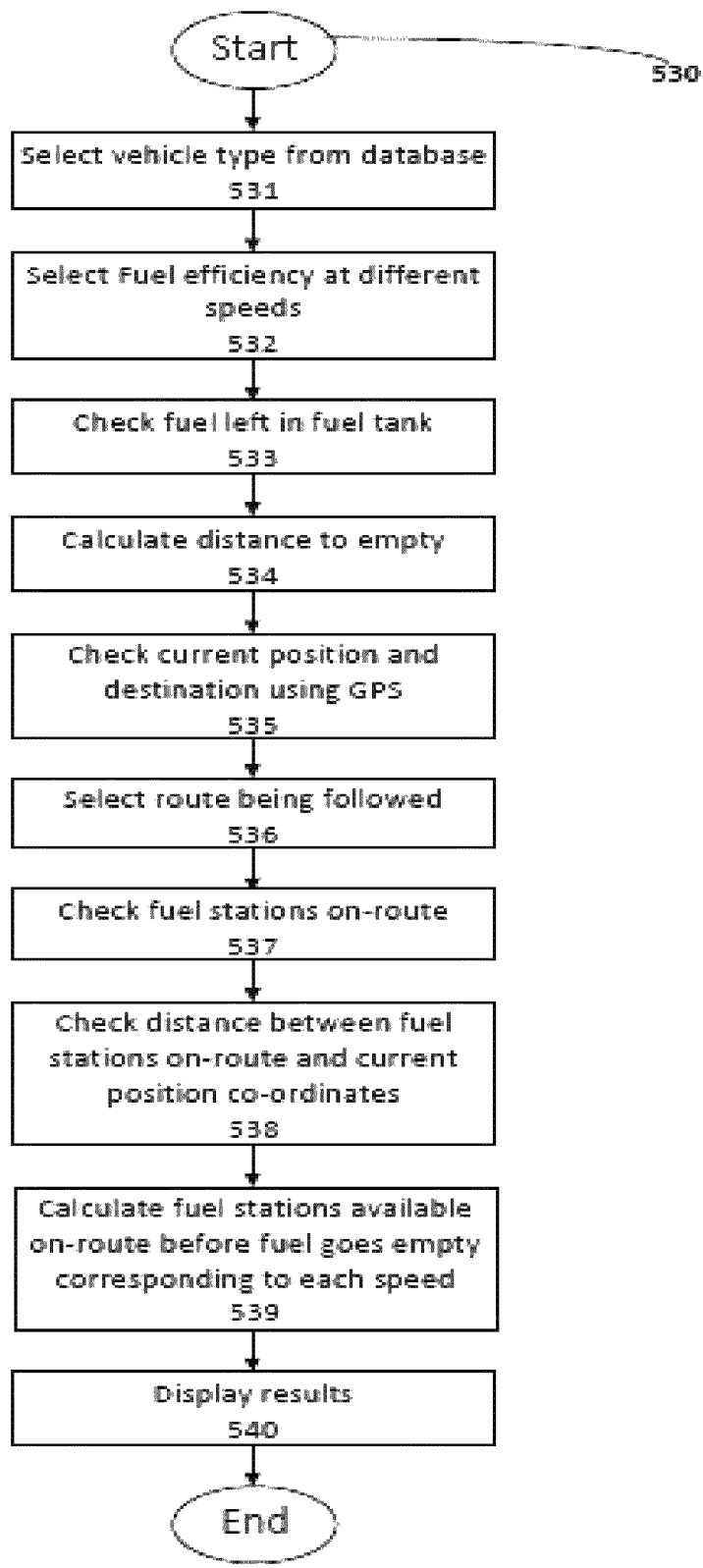

An exemplary method 530 used to calculate method 490 is depicted in FIG. 5e. At step 531, the VMOS system 300 will first select the vehicle which is currently being driven. At step 532, the VMOS system will select the mileage of that vehicle at different speeds (tested under standard conditions) from the server database 320. Following this, at step 533, the VMOS system will get information about the fuel left in the fuel tank from the ECU of the vehicle by using OBD tool. After having all this information, at step 534, the VMOS system calculates the distance which would be covered by that vehicle before it goes empty. At step 535, the VMOS system checks for the current position/point of origin and the point of destination using GPS system and check distance to be covered by analyzing the route which is being followed by user at step 536. After analyzing route, at step 537, the VMOS system searches for the nearest/on-route fuel station(s) in the GPS database by checking the current position and route of the user and searching fuel station(s) whose position co-ordinates lays on-route which is currently being followed by the user. At the end of the search, at step 538, if VMOS system found any results, then it will check their distance from current position of user. Now, by comparing it with the 'distance to empty' at different speeds (checked at step 534), the VMOS system calculates the total number of fuel stations that will fall on the route before the fuel goes empty at step 539. If the VMOS system is unable to find any fuel station which can be reached before the fuel goes empty then the system will check for another route on which fuel station is approachable before the fuel in the vehicle goes empty. At the end, at step 540, the VMOS system displays results to the user using the display module 309 on his computing device. Exemplary results are shown in FIG. 5b by method 490.

In solution 495 of method 50 of FIG. 5b, the GPS data processing module 307 (FIG. 3) and speed and Fuel measuring module 305 (FIG. 3) of VMOS 300 (FIG. 3) checks for the fine/penalty which may be implemented to the user for over speeding of his vehicle. Here the VMOS system 300 uses multiple values of speed, current position, and destination of user, route which is being followed and the information about the fine/penalty charges on particular route which is being followed by the user. The values for fine/penalty charges on particular route will be selected by VMOS from the database 320 (FIG. 3). The display module 309 displays the fine/penalty to the user on the computing device. An exemplary flow of instructions used to calculate method 495 is depicted in FIG. 5f.

Figure 5F:
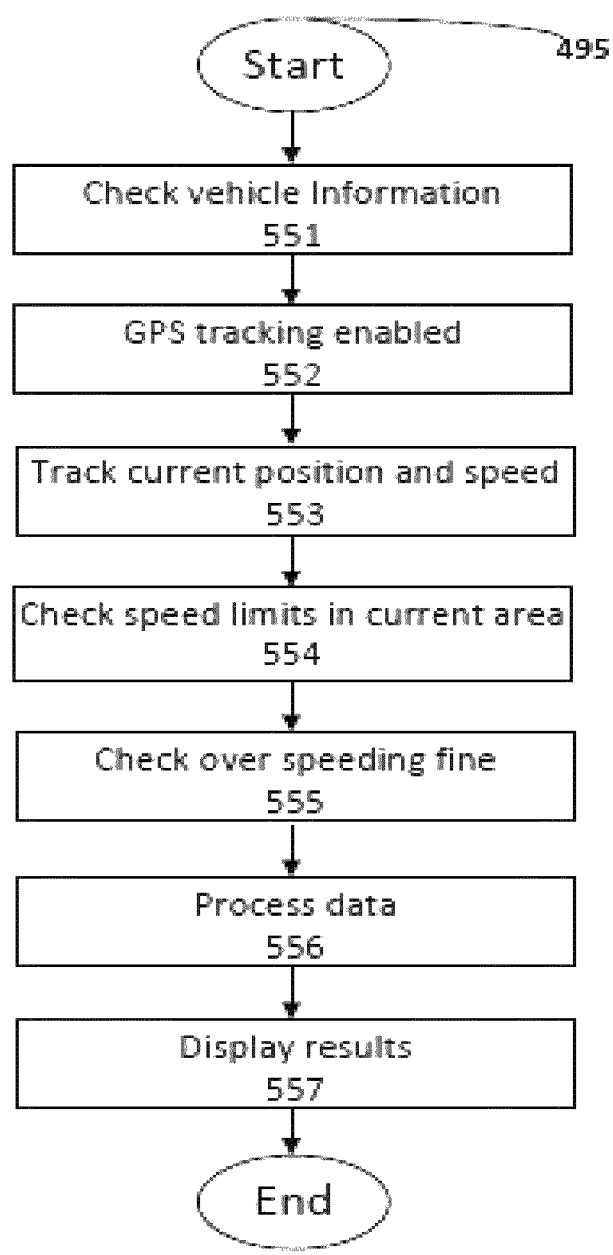
Figure 5G:
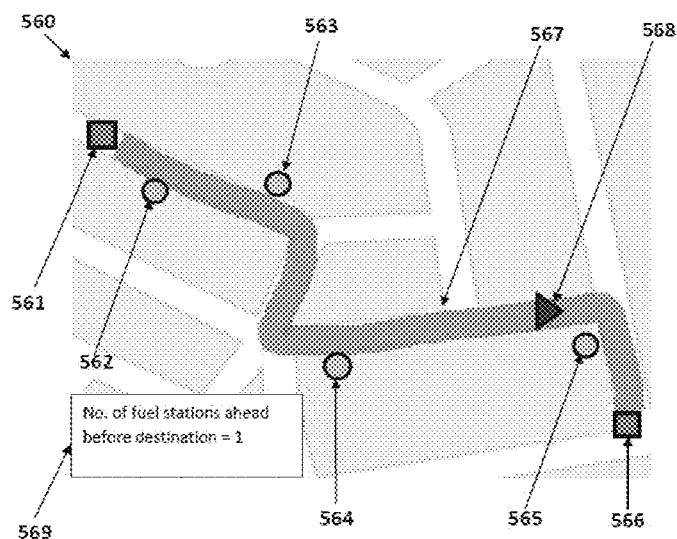
FIG. 5g illustrates an exemplary system for representing present invention to display 'Number of fuel stations on upcoming journey', in accordance with an embodiment of the present subject matter.

In FIG. 5f, an exemplary method 550 is used to calculate method 495 of FIG. 5b. At step 551, the VMOS will first obtain the information about the vehicle like make, model, type (Heavy motor vehicle, Might motor vehicle, etc.,) etc. The VMOS 300 obtains this information the database 320 (FIG. 3) or from the ECU of the vehicle. After this, in step 552, VMOS will enable the GPS tracking of the device which is used to track the current position of the vehicle. After this, in step 553, the VMOS will track the current position of the vehicle and measure the current speed of the user. The VMOS measures the current speed of the vehicle by using the speed and fuel measuring module 305 (FIG. 3). The speed and fuel measuring module 305 can measure the speed from the GPS or from the ECU of the vehicle. After the values of speed are obtained, in step 554, the VMOS will check for the speed limits for the vehicle on the route currently being followed by the user. After obtaining the speed limit on route, in step 555, the system will check for the fine/penalty charges which the user may have to pay in case he's caught for the offense of over speeding. In step 556, the VMOS will process the information about vehicle type, current speed, speed limits and over speeding fine/penalty. Then in step 557, the system will display the results to the user using the display module 309 on his device. Exemplary results are shown in FIG. 5b by method 495.

FIG. 5g is an another alternative and improved way to calculate and display the parameters displayed in method 49 of FIG. 5a. In this figure, an exemplary method 560 is used to illustrate the present invention. Here in method 560 the VMOS calculates and display the numerical value of total number of fuel stations available on remaining part of the journey without using any value of speed, mileage or gear. Here the 561 represents the point of origin, 566 represent the point of destination, 567 represent the route followed by user, 568 represent the current position of user, 569 represent the display of numerical value of information about fuel stations available on upcoming part of journey and 562, 563, 564, 565 represent 4 fuel stations that are available on route 567 between point of origin 561 and point of destination 566. In method 560, the VMOS uses the multiple values of location of fuel stations, route which is being followed by user and current position and destination of user to calculate the number of fuel stations available on upcoming part of journey.

Figure 5H:
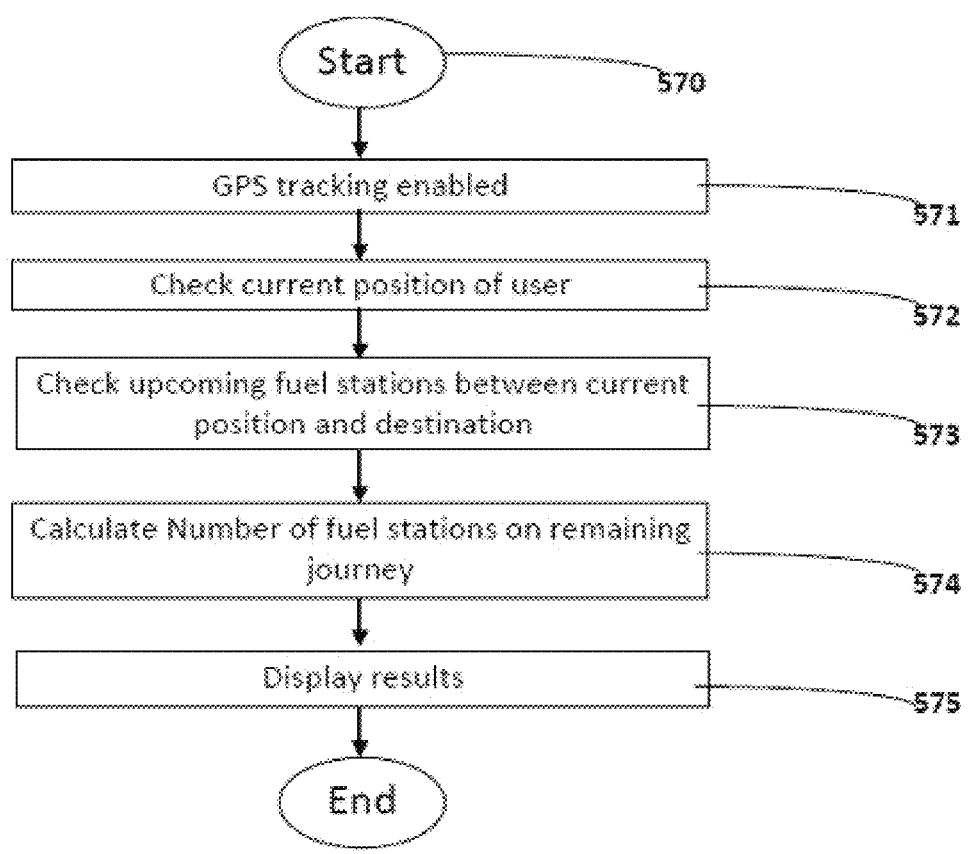

An exemplary method 570 used to calculate method 560 is depicted in FIG. 5h. In step 571, VMOS will enable the GPS tracking of the device which is used to track the current position of the vehicle. After this, in step 572, the VMOS will track the current position of the vehicle. After this, in step 573, the VMOS searches for the on-route fuel station(s) with the help of GPS. The VMOS searches for fuel stations on-route between the current position of user and destination. After this, in step 574, the VMOS calculates the number of fuel stations on upcoming part of journey. In step 575, VMOS displays the information using the display module 309 on device the numerical values of fuel stations available on upcoming part of journey. Exemplary results are shown in FIG. 5g by method 560.

Figure 6A:
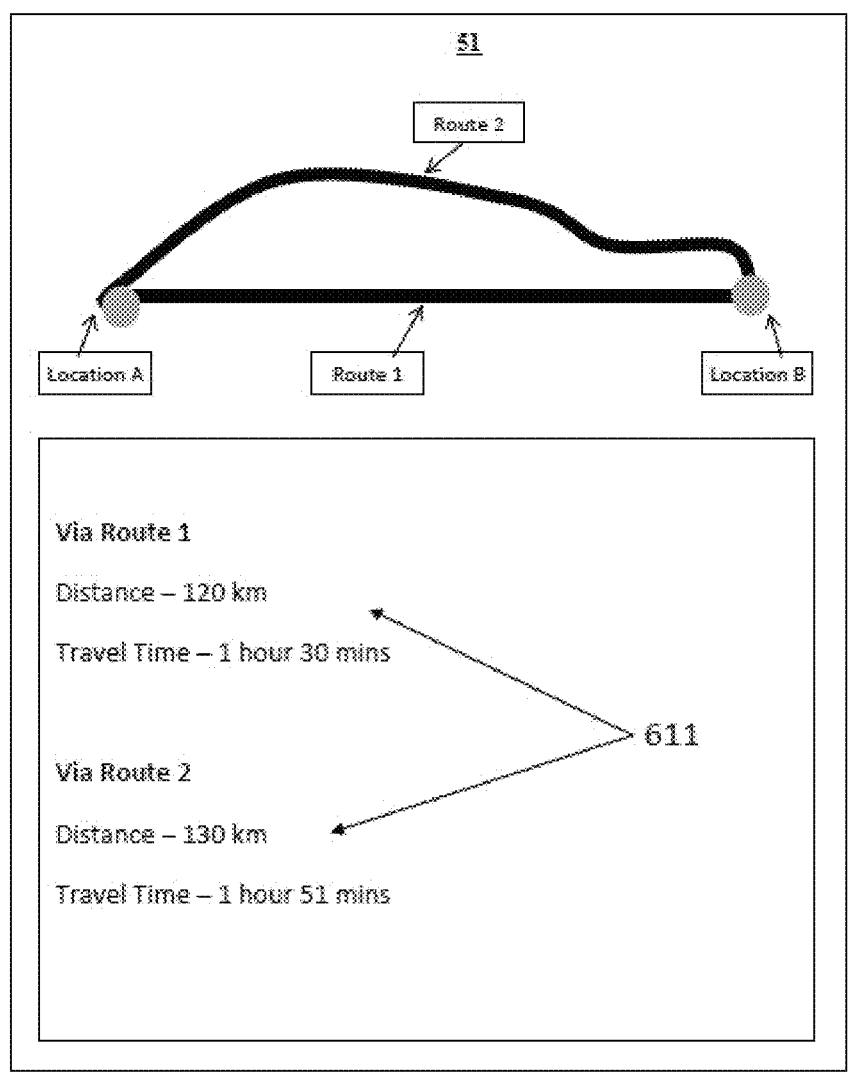
FIG. 6a illustrates an exemplary system for representing traditional method to display multiple route options from an origin to destination.

FIG. 6a represents a tradition method 51 to display route options if multiple routes are available from origin to destination. Here Location 1 represents point of origin or current position, Location 2 represents destination, Route 1 and 2 represents multiple route options available and information 611 presents information about available routes. Here in traditional system, when a user searches for a destination, then the system checks for multiple route options available to reach that destination. After that, the system chooses preferred route on the basis of time or distance, i.e., system chooses route that can be travelled in shortest time or shortest distance.

Figure 6B:
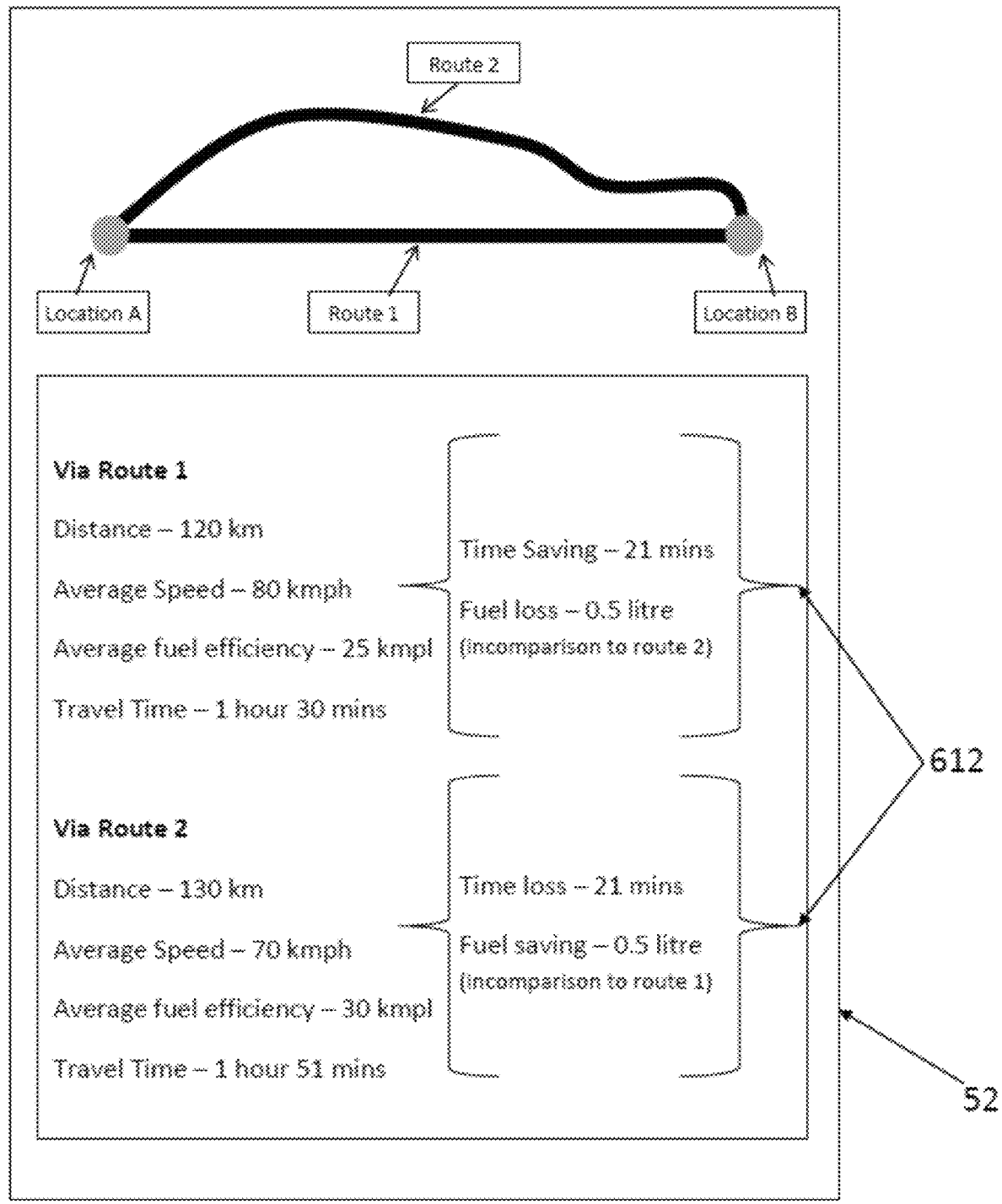
FIG. 6b illustrates an exemplary system for representing present invention to display multiple route options from an origin to destination, in accordance with an embodiment of the present subject matter.

FIG. 6b represents an innovative method 52 to display route options if multiple routes are available from origin to destination. Here Location 1 represents point of origin or current position, Location 2 represents destination, Route 1 and 2 represents multiple route options available and information 612 presents information about available routes. The inventive concept here is to check for additional parameters while deciding the preferred route. Here the present VMOS system provides additional information (fuel save/loss) to user by using which the user can choose between the route options available. As example, in 612, along with the traditional information the system displays information like fuel saving, time loss and average travel speed on that route. It guides the user that if user chooses Route 1, then user will cover the journey of 120 km in 1 hr 30 mins (approximately) with an average speed of 80 kmph. In this journey the user will get a fuel efficiency of 25 kmpl (tested under standard conditions). Overall if the user chooses route 1 over route 2, then user will reach at destination with a time gain of 21 mins (as compared with the time taken in route 2) but will burn 0.5 litre more fuel (as compared with the fuel consumption in route 2). Similarly, for route 2, user will cover the journey of 130 km in 1 hr 51 mins (approximately) with an average speed of 70 kmph. In this journey the user will get a fuel efficiency of 30 kmpl (tested under standard conditions). Overall if the user chooses route 2 over route 1, then user will reach at destination with a time loss of 21 mins (as compared with the time taken in route 1) but will save 0.5 litre more fuel (as compared with the fuel consumption in route 1).

In the above discussed methods, i.e., 52 (FIG. 6b) of the current invention, the invention explains about the method and use of displaying multiple routes with comparison of time and fuel consumption in all.

Figure 6C:
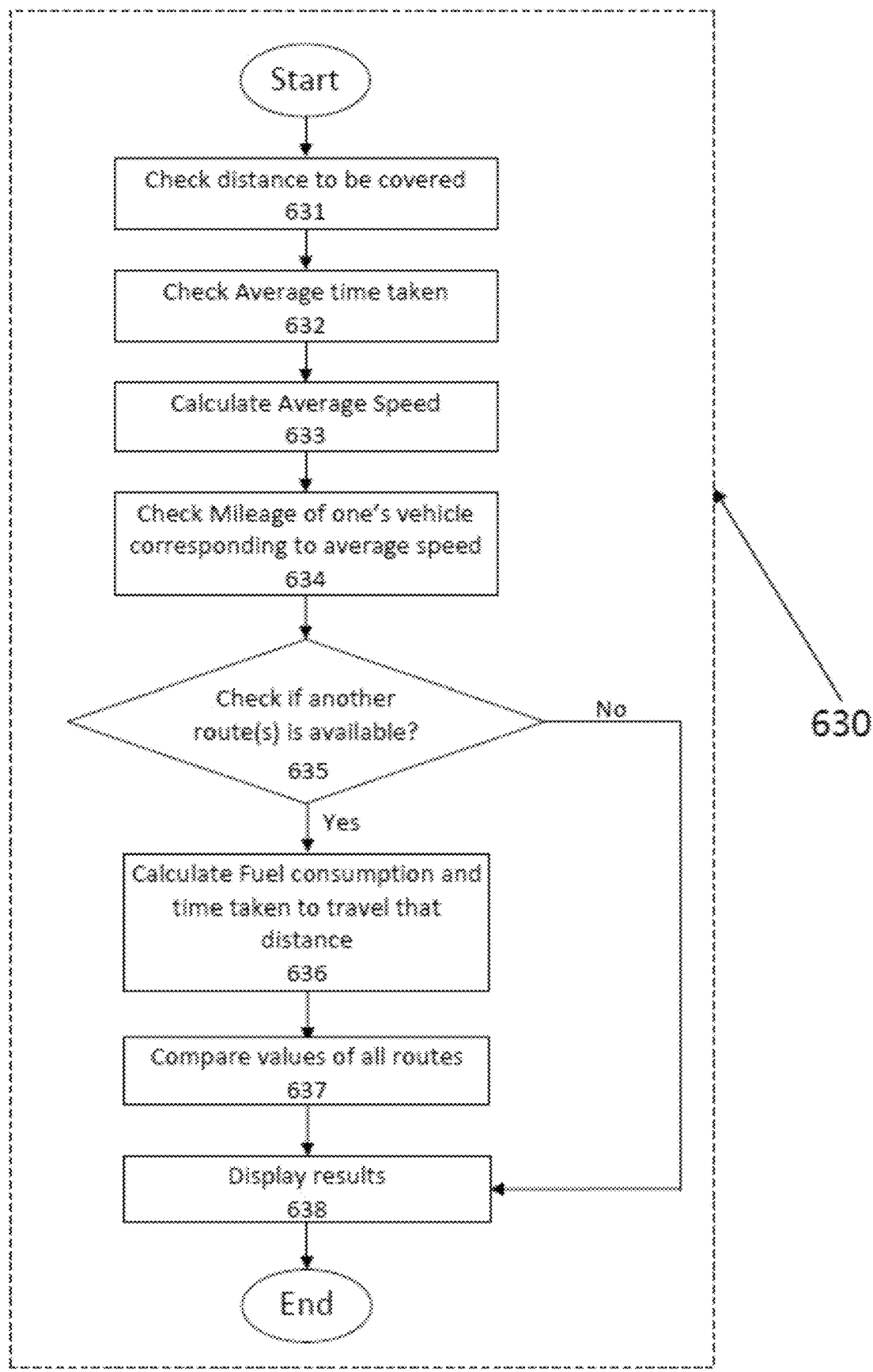
FIG. 6c illustrates a method for determining and displaying the multiple routes and displaying comparison of their fuel and time consumption, in accordance with an embodiment of the present subject matter.

FIG. 6c illustrates an exemplary method 630 to calculate and compare the average time and fuel consumption in all possible routes so that the user can select the route as per his preference of time or fuel saving. In this method, initially in step 631, the VMOS system checks the distance which is to be covered between the point of origin and destination. After checking the distance, at step 632, the VMOS system checks for the average time taken to cover the distance between the point of origin and destination. After calculating the values of time taken, the system calculate the average speed of the journey by using values of distance to be covered and average time taken at step 633. For example, if the distance between two points is 120 km and average time taken to cover this distance is 1 hour and 30 minutes, then it can be easily calculated that the average speed of journey would be around 80 km/h. After calculating the average speed, the VMOS system retrieves values of fuel efficiency and correct gear from server database 320 (FIG. 3) for the current vehicle at different speeds at step 634. Now the VMOS system 300 checks for any other route to travel between the point of origin and destination at step 635. At step 638, if No other route is found, the VMOS system displays the calculated information without any comparison. But, if in step 635, the VMOS found another route, then it calculates the fuel consumption and average time taken to travel for that route at step 636. Now, (in step 637) the VMOS 300 compares values of all the routes. After comparing, at step 638, it will display the comparative values to the user.

Figure 7A:
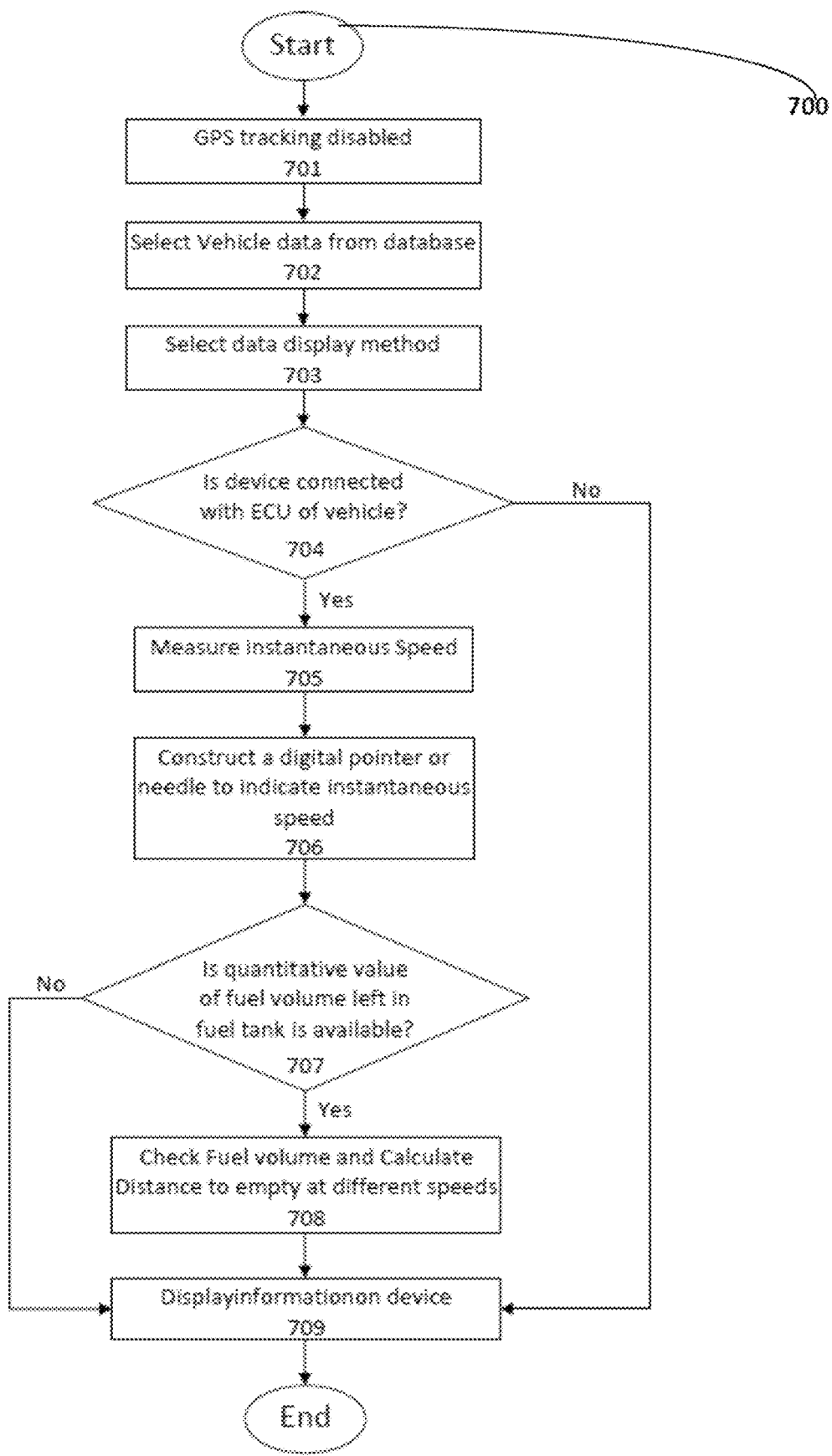
FIG. 7a illustrates a method for implementing the present invention where the communication with ECU of vehicle may be possible, in accordance with an embodiment of the present subject matter.
Figure 7B:
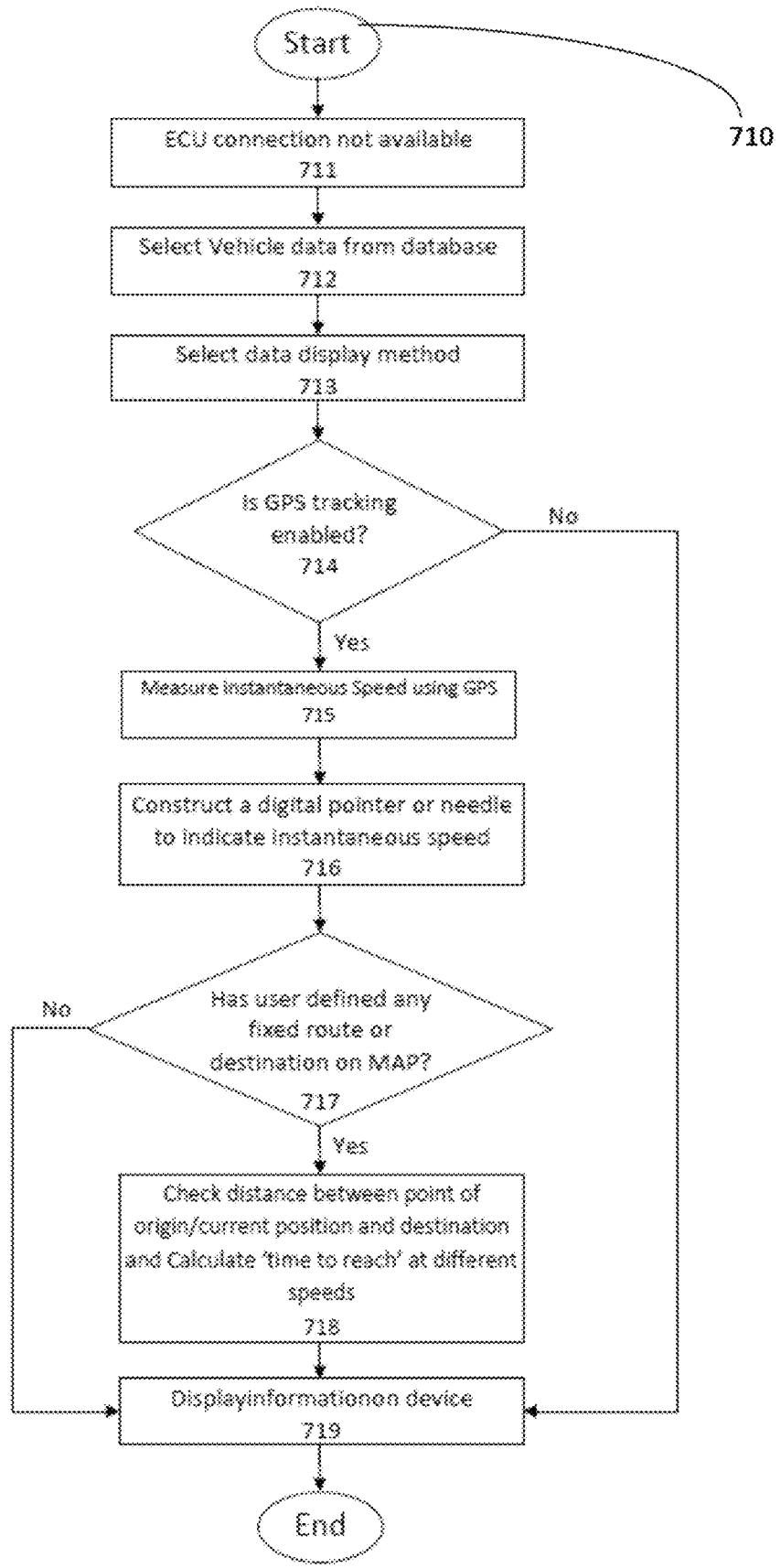
FIG. 7b illustrates a method to implement present invention where the GPS tracking of the device may be enabled, in accordance with an embodiment of the present subject matter.
Figure 7C:
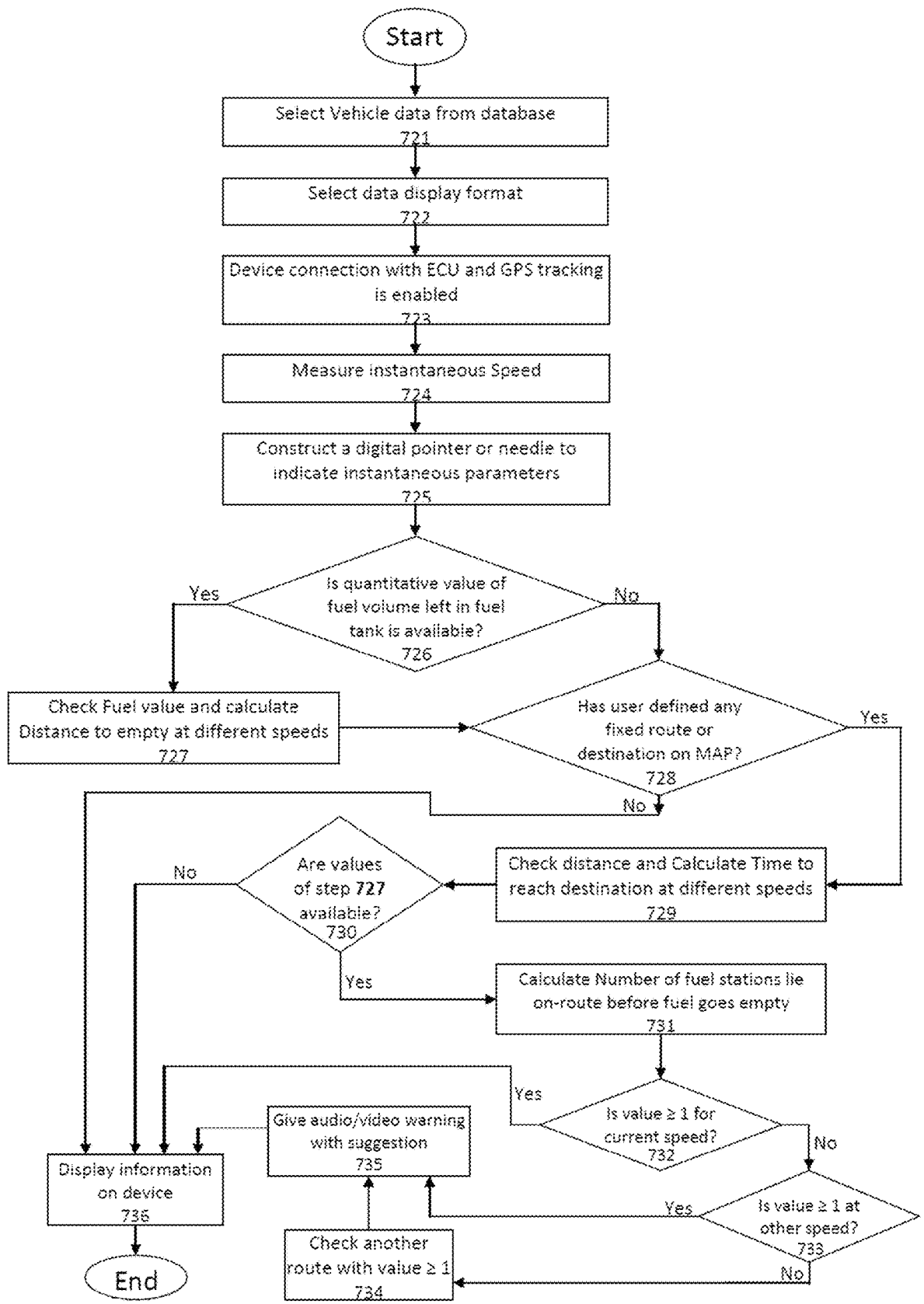
FIG. 7c illustrates a method to implement present invention where the communication with ECU (Electronic Control Unit) of vehicle is possible and GPS tracking of the device is enabled, in accordance with an embodiment of the present subject matter.

FIGS. 7a, 7b, and 7c illustrates methods embodying aspects of the present invention, i.e., it illustrates a method and system to display vehicle's mileage under standard conditions along with 'distance to empty', 'fuel stations on-route before fuel goes empty' 'time to reach', and related audio/video warnings.

FIG. 7a illustrates method embodying aspects of the present invention where the computing device may have a connection/communication with the ECU of vehicle but the GPS of device is not enabled. The method starts with 701 where the GPS tracking facility of device is disabled or not available. Then at step 702, a user or system selects the vehicle type/make/model, etc., and VMOS system searches for the corresponding data in the database. In case the communication with ECU is available, then the vehicles details can be fetched from ECU also. To communicate with ECU, an OBD or any tool compatible with vehicle's ECU protocol can be used. After the VMOS system returns with corresponding data, instep 703, the user will be asked to select the display method in which the information will be shown. Then in step 704, the VMOS system checks whether the computing device has established connection/communication with the ECU of vehicle or not. If connection/communication with ECU is not established, then the VMOS system will display the information retrieved from the database in the display method selected by the user (at step 709) using the display module 309. At step 705, if connection/communication with ECU is established, the VMOS system will get the instantaneous speed value of the vehicle from the ECU. To indicate the instantaneous speed value, at step 706, the VMOS system constructs a pointer/needle 404 (as shown in FIG. 4d) programmatically. Now in next step 707, the VMOS system communicates with ECU to get the values of fuel left in the fuel tank. If VMOS system failed to get those values, then it will display the information using the display module 309, at step 709, retrieved from database at step 702 along with a pointer/needle 404 to indicate instantaneous values. If VMOS system succeeds to get those values, then for each particular speed it will calculate the distance which a vehicle will cover before the fuel goes empty at step 708. Here the VMOS system uses fuel left values, Speed values and the values of mileage (tested under standard conditions). After the calculation is complete, in step 709 the VMOS system displays the complete information, i.e., fetched from database in step 702 and information calculated in step 708 along with a pointer/needle to indicate instantaneous values on the computing device using the display module 309.

FIG. 7b illustrates a method embodying aspects of the present invention where the computing device may have enabled the GPS tacking of the device but the communication with the ECU of vehicle is not available. The method starts with 711 where the communication of device with the ECU of vehicle is not available. Then in step 712, a user or system selects the vehicle type/make/model etc. and VMOS system searches for the corresponding data in the database 320. After the VMOS system returns with corresponding data, in step 713, the user will be asked to select the display method in which the information will be shown. Then in step 714, the VMOS system checks whether the GPS tracking facility of the device is enabled or not. If GPS tracking is disabled, then the VMOS system will display the information retrieved from the database in the display method selected by the user at step 719. If GPS tracking is enabled, then the VMOS system get the instantaneous speed value of the vehicle from the GPS at step 715. To indicate the instantaneous speed value, the VMOS system constructs a pointer/needle programmatically at step 716. Now in next step 717, the VMOS system checks whether the user has defined any route or destination on virtual navigation system (e.g. Map) or not. If no route or destination is defined, then it will display the information at step 719 retrieved from database (in step 712) along with a pointer/needle to indicate instantaneous values. If any route or destination is defined, then in step 718, the VMOS system checks the distance between the current position or point of origin and the destination via route opted by user. Now the VMOS system calculates the time it will take to reach the destination at different speeds. Here the VMOS system uses multiple values of Speed, values of mileage (tested under standard conditions) and the distance between the current position or point of origin and the destination via route opted by user. After the calculation is complete, in step 719, the VMOS system displays the complete information (i.e., fetched from database (in step 712) and information calculated in step 718) along with a pointer/needle to indicate instantaneous values on the computing device using the display module 309.

FIG. 7c illustrates a method embodying aspects of the present invention where the device has enabled the GPS tacking of the device and the communication with the ECU of vehicle is available. To communicate with ECU, an OBD or any tool compatible with vehicle's ECU protocol can be used. The method starts with 721 where a user or system selects the vehicle type/make/model etc. and system searches for the corresponding data in the database. This information about vehicle type/make/model etc can be fetched from ECU also. After the system returns with corresponding data, in step 722, the user will be asked to select the display method in which the information will be shown. Then in step 723, the VMOS system enables the GPS tracking facility of the device and the connection/communication of device with the ECU of vehicle. Then in step 724, the VMOS system gets the instantaneous speed value of the vehicle from the GPS and/or from the ECU. After getting speed values, in step 725, the VMOS system constructs a pointer/needle programmatically to indicate the instantaneous speed value. Now in next step 726, the VMOS system communicates with ECU to get the values of fuel left in the fuel tank. If VMOS system failed to get those values, then it will move to step 728 where it will check if the user has defined any route or destination on virtual navigation system (e.g. MAP). But, in step 726, if VMOS system succeeds to get those values, then for each particular speed it will calculate the distance which a vehicle will cover before the fuel goes empty at step 727. Here the VMOS system uses fuel left values, Speed values and the values of mileage (tested under standard conditions). After the calculation is complete in step 727, the VMOS system checks for next parameter at step 728 where it will check if the user has defined any route or destination on virtual navigation system (e.g. MAP) or not. If no route or destination is defined, then it will move to step 736, where it will display the information retrieved from database in step 721, i.e., Speed, mileage at each speed (tested under standard condition), Gear and information calculated in step 727 (Distance to empty at each speed) along with a pointer/needle to indicate instantaneous values. If in 728, user has defined any route or destination, then the system will move to 729, where it will check the distance between the current position or point of origin and the destination via route opted by user. Now the system will calculate the time it will take to reach the destination at different speeds. Here the VMOS system will use multiple values of Speed, values of mileage (tested under standard conditions) and the distance between the current position or point of origin and the destination via route opted by user. After the calculation is complete, in step 730 the VMOS system will check if the values of fuel left and distance to empty are available or not. If not available, then it will move to step 736, where it displays the information retrieved from database in step 721, i.e., Speed, mileage at each speed (tested under standard condition), Gear, information (Distance to empty at each speed) calculated in step 727, information about time it takes to reach the destination at different speeds (calculated in step 729) along with a pointer/needle to indicate instantaneous values. On the other hand, in step 730, if the VMOS system has values of fuel left and distance to empty then, it will move to step 731 where it will calculate the total number of fuel stations that lie on-route (currently followed by user) before the fuel left goes empty. The VMOS system will check total number of fuel stations at different speeds. Proceeding further to step 732, if at instantaneous speed, there is at least 1 fuel station(s) that lie on-route (as calculated in step 731) then the VMOS system proceed to step 736, where it will display the complete information, i.e., retrieved from database (in step 721), i.e., Speed, mileage at each speed (tested under standard condition), Gear, information (Distance to empty at each speed) calculated in step 727, information about time it will take to reach the destination at different speeds (calculated in step 729), Number of fuel stations on-route before fuel goes empty along with a pointer/needle to indicate instantaneous values. But (preceding back to step 732) if at instantaneous speed, there is less than 1 fuel station (i.e. zero) that lie on-route (as calculated in step 731) then, (in step 733) the system will check for another values of speed at which there is at least 1 fuel station(s) that lie on-route. If found, then system will proceed to step 735 where it
will give audio/video notification/warning to the user and suggest him to drive at a speed at which if driven, there lies at least 1 fuel station on-route before the fuel goes empty. Or else, in step 733, if any values of speed there is no fuel station(s) that lie on-route then it will move to 734 where it will check for another route at which there exists at least 1 fuel station before the fuel goes empty. Then system will proceed to step 735 where it will give audio/video notification/warning to the user and (if found any alternative route) suggest him to shift to another route and speed at which if driven, there lies at least 1 fuel station before the fuel goes empty. If no route is found with any fuel station on it, then the system may suggest him to call for help from a friend or emergency service available. Following this, the system proceeds to 736, where it will display the complete information i.e. retrieved from database (in step 721), i.e., Speed, mileage at each speed (tested under standard condition), Gear, information (Distance to empty at each speed) calculated in step 727, information about time it will take to reach the destination at different speeds (calculated in step 729), Number of fuel stations on-route before fuel goes empty along with an audio/visual warning/notification (if any) and a pointer/needle to indicate instantaneous values.

The method discusses in FIG. 7(c) to calculate number of fuel stations on remaining route before the fuel goes empty can also be used to calculate the number of hospitals, washrooms, restaurants, hotels or other such services (whose location can be traced on virtual navigation system) before the fuel present in vehicle's fuel tank goes empty.

Although embodiments for the present subject matter have been described in language specific to structural features, it is to be understood that the present subject matter is not necessarily limited to the specific features described. Rather, the specific features and methods are disclosed as embodiments for the present subject matter. Numerous modifications and adaptations of the system/device of the present invention will be apparent to those skilled in the art, and thus it is intended by the appended claims to cover all such modifications and adaptations which fall within the scope of the present subject matter.

We claim:

1. A vehicle mileage optimization system (300) for optimizing mileage of a vehicle by informing user about route, gear, and speed combinations, the vehicle mileage optimization system (300) comprising:
   a speed transducer (102) and a fuel volume transducer (104) configured to sense a current speed and a current fuel available in the vehicle;
   an Electronic Control Unit (ECU) (105) in communication with the speed transducer (102) and the fuel volume transducer (104) via an On-Board Diagnostic (OBD) (106) interface, wherein the ECU unit (105) is configured to capture the current speed (401) and the current fuel available in the vehicle from the speed transducer (102) and the fuel volume transducer (104) respectively;
   a memory (303) configured for storing a predefined mileage data corresponding to multiple combinations of a speed and a gear of the vehicle;
   a Global Positioning system (GPS) data processing module (307) configured to determine an origin, a destination, a current location of the vehicle, multiple routes available between the origin and the destination and metadata associated with each route of the multiple routes, wherein the metadata comprises fuel stations, hospitals, washrooms, restaurants, hotels and garages;
   a speed and fuel measuring module (305) configured to receive the current speed and the current fuel in the vehicle from the ECU (105);
   a mileage and distance estimation module (306) configured to determine mileage, distance to empty and time to reach the destination corresponding to different speeds and different gears on each route of the multiple routes based upon the predefined mileage data and the current fuel irrespective of whether the vehicle is stationary or in transit; and
   a display module (309) configured for displaying the metadata along with multiple parameters including the mileage, the distance to empty and the time to reach the destination corresponding to different speeds and different gears corresponding to each route of the multiple routes, thereby enabling comparative analysis between the multiple parameters in view of the metadata corresponding to the multiple routes, for assisting the user in selecting a preferred route, and optimal speed-gear combination for the preferred route.

2. The vehicle mileage optimization system (300) of claim 1, wherein the GPS data processing module (307) determines the origin, the destination, the current location of the vehicle, the multiple routes available between the origin and the destination and the metadata associated with each route using a GPS satellite or a tower (108), wherein the metadata further comprises the current speed of the vehicle, a speed limit and an over speed fine in at least one area of each route of the multiple routes, and wherein the GPS data processing module (307) compares the speed of the vehicle with the speed limit of the current area and displays the metadata along with the over speed fine.

3. The vehicle mileage optimization system (300) of claim 1, wherein the mileage and distance estimation module (306) displays a number of fuel stations (490) on each route before the vehicle runs out of fuel.

4. The vehicle mileage optimization system (300) of claim 1, wherein the mileage and distance estimation module (306) in communication with the GPS data processing module (307) determines the number of fuel stations (490) remaining in the journey before the vehicle runs out of fuel.

5. A method for optimizing mileage of a vehicle by informing a user about route, gear, and speed combinations, the method comprising:
   capturing, via an ECU unit through an On-Board Diagnostic (OBD) interface, a current speed and current fuel available in the vehicle wherein the current speed and current fuel are obtained from a speed transducer and a fuel volume transducer configured to sense the speed and the fuel available in the vehicle respectively;
   storing, in a memory, a predefined mileage data corresponding to multiple combinations of a speed and a gear of the vehicle;
   determining, via a Global Positioning system (GPS) data processing module, an origin, a destination, a current location of the vehicle, multiple routes available between the origin and the destination and metadata associated with each route, wherein the metadata comprises fuel stations, hospitals, washrooms, restaurants, hotels and garages;
   determining, via a mileage and distance estimation module (306), mileage, distance to empty and time to reach the destination corresponding to different speeds and different gears on each route of the multiple routes based upon the predefined mileage data pre-stored in the memory and the current fuel irrespective of whether the vehicle is stationary or in transit, wherein the predefined mileage data correspond to multiple combinations of a speed and a gear of a vehicle; and
   displaying, via a display module (309), the metadata along with multiple parameters including the mileage, the distance to empty and the time to reach the destination corresponding to different speeds and different gears corresponding to each route of the multiple routes and number of fuel stations (490) remaining in a journey before the vehicle runs out of fuel, thereby enabling comparative analysis between the multiple parameters in view of the metadata corresponding to the multiple routes, for assisting the user in selecting a preferred route, and optimal speed-gear combination for the preferred route.

6. The method of claim 5, wherein the method further comprises determining the origin, the destination, the current location of the vehicle, the multiple routes available between the origin and the destination and the metadata associated with each route using a GPS satellite or a tower (108), wherein the metadata further comprises the current speed of the vehicle, a speed limit and an over speed fine in at least one area of each route of the multiple routes, and wherein the GPS data processing module (307) compares the speed of the vehicle with the speed limit of the current area and displays the metadata along with the over speed fine.

* * * * *